US011407598B2

(12) United States Patent
Winkler et al.

(10) Patent No.: US 11,407,598 B2
(45) Date of Patent: Aug. 9, 2022

(54) AUTOMATED ROUND TUBE LOADING MACHINE

(71) Applicants: Rodney B. Winkler, Chatsworth, GA (US); Robert K. Winkler, Chatsworth, GA (US); Ricky L. Davis, Chatsworth, GA (US)

(72) Inventors: Rodney B. Winkler, Chatsworth, GA (US); Robert K. Winkler, Chatsworth, GA (US); Ricky L. Davis, Chatsworth, GA (US)

( * ) Notice: Subject to any disclaimer, the term of this patent is extended or adjusted under 35 U.S.C. 154(b) by 397 days.

(21) Appl. No.: 16/591,609

(22) Filed: Oct. 2, 2019

(65) Prior Publication Data

US 2020/0102158 A1 Apr. 2, 2020

Related U.S. Application Data

(60) Provisional application No. 62/740,275, filed on Oct. 2, 2018.

(51) Int. Cl.
*B65G 47/90* (2006.01)
(52) U.S. Cl.
CPC .... *B65G 47/905* (2013.01); *B65G 2201/0276* (2013.01)

(58) Field of Classification Search
CPC combination set(s) only.
See application file for complete search history.

(56) References Cited

U.S. PATENT DOCUMENTS

| 8,924,007 | B2 * | 12/2014 | Arunapuram | G06Q 10/083 |
| | | | | 700/229 |
| 9,815,107 | B1 * | 11/2017 | Hofsteede | B21D 43/16 |
| 2017/0073160 | A1 * | 3/2017 | Perini | B65G 47/5104 |
| 2017/0341879 | A1 * | 11/2017 | Plett | B65G 17/12 |
| 2018/0125231 | A1 * | 5/2018 | Reyes | A47B 81/005 |
| 2020/0102158 | A1 * | 4/2020 | Winkler | B65B 57/14 |

* cited by examiner

*Primary Examiner* — Kyle O Logan
(74) *Attorney, Agent, or Firm* — Charlena Thorpe, Esq.; Incorporating Innovation LLC

(57) ABSTRACT

Implementations of an automated round tube loading machine are provided. In some implementations, the automated round tube loading machine comprises a tube pickup mechanism, a tube stacking mechanism, and a tube loading mechanism. In some implementations, the automated round tube loading machine may further comprise a front side conveyor, a back side conveyor, and/or a computer system. In some implementations, a method of operation of the automated round tube loading machine comprises the machine receiving, picking up, moving, dropping off, stacking, and loading a plurality of round tubes into a box.

12 Claims, 29 Drawing Sheets

AUTOMATED ROUND TUBE LOADING MACHINE

CROSS REFERENCE TO RELATED APPLICATION

This application claims the benefit of U.S. Patent Application Ser. No. 62/740,275, which was filed on Oct. 2, 2018, and is incorporated herein by reference in its entirety.

TECHNICAL FIELD

This disclosure relates to implementations of an automated round tube loading machine.

BACKGROUND

Round tubes made of cardboard or other material are used to hold yarn or other products. Before the round tubes are used for such purposes, the tubes are usually manually loaded into boxes for storage, transport, etc. For example, after the round tubes are manufactured, the tubes are manually placed into the boxes before usage.

As shown in FIGS. 1A-1D, the round tubes are usually stacked in the boxes in one set (FIGS. 1A, 1C) or two sets of eleven rows of the tubes packed vertically (e.g. end to end, FIG. 1B) or horizontally (e.g. side by side, FIG. 1D). The stacked rows usually start with a first or bottom row of thirteen of the tubes. A second row of twelve of the tubes is usually placed next to the first row of tubes. A third row of thirteen of the tubes is usually placed next to the second row of tubes. The rest of the rows of tubes are similarly stacked alternating between a row of thirteen of the tubes and a row of twelve of the tubes with the last or top row having thirteen of the tubes.

The loading of the round tubes into the boxes in this manner is tedious and time consuming since the loading is done manually.

DETAILED DESCRIPTION

Figure 1A:
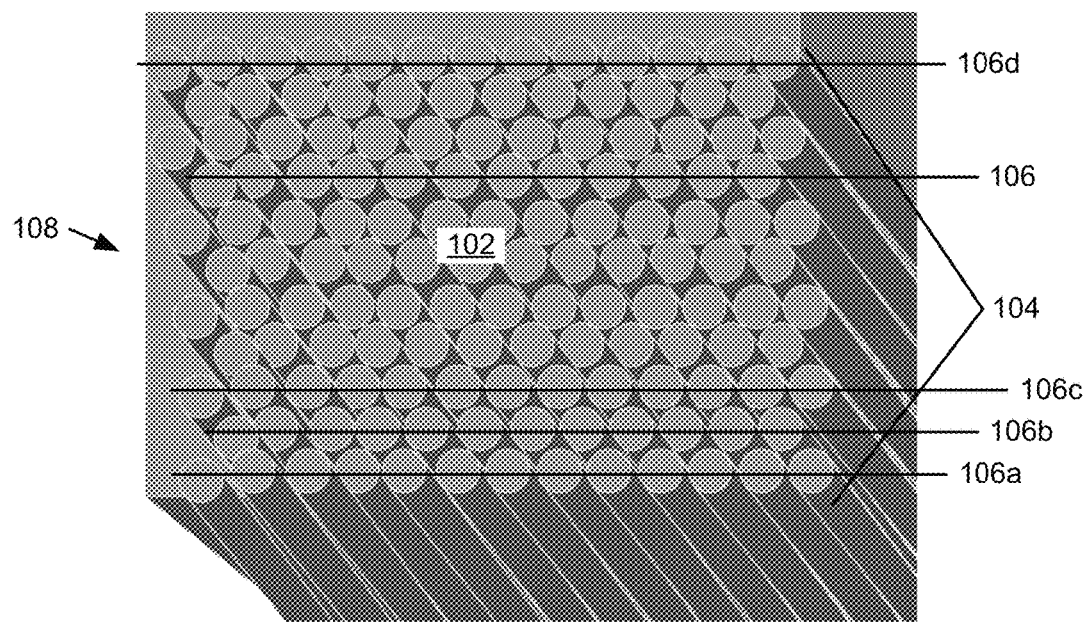
FIGS. 1A-1D illustrate examples of round tubes stacked in sets of rows in a box.

Implementations of an automated round tube loading machine are provided. In some implementations, the automated round tube loading machine comprises a tube pickup mechanism, a tube stacking mechanism (or "elevator"), and a tube loading mechanism (or "box plunger"). In some implementations, the automated round tube loading machine may further comprise a front side conveyor and/or a back side conveyor. In some implementations, the automated round tube loading machine may further comprise a computer system or similar component such as a controller, control circuitry, etc.

In some implementations, a method of operation of the automated round tube loading machine comprises the tube pickup mechanism receiving a plurality of round tubes. In some implementations, the method comprises the tube pickup mechanism capturing or securing in a group (or "picking up") the plurality of round tubes. In some implementations, the method comprises the tube pickup mechanism moving the plurality of round tubes to the elevator. In some implementations, the method comprises the tube pickup mechanism releasing or "dropping off" the plurality of round tubes at the elevator. In some implementations, the method comprises the elevator stacking the plurality of round tubes to form a set of pluralities of the round tubes. In some implementations, the method comprises the box plunger loading the formed set of pluralities of the round tubes into a box.

In some implementations, the automated round tube loading machine is configured to automatically group, stack, and load round tubes used for holding yarn or other products into boxes for storage, transport, etc.

In some implementations, the automated round tube loading machine is configured to group a plurality of the round tubes into a row for stacking multiple rows of the tubes into sets for loading into boxes. For example, in some implementations, the automated round tube loading machine is configured to alternatingly group thirteen of the round tubes into a row and twelve of the round tubes into a row for stacking of the alternating rows of tubes for loading into boxes.

In some implementations, the automated round tube loading machine is configured to stack grouped pluralities of the round tubes into sets for loading of the tubes into boxes. For example, in some implementations, the automated round tube loading machine is configured to stack eleven grouped rows of the round tubes into vertically stacked sets of rows for loading of the tubes into boxes.

In some implementations, the automated round tube loading machine is configured to load sets of grouped pluralities of the round tubes into boxes. For example, in some implementations, the automated round tube loading machine is configured to load sets of eleven vertically stacked alternating rows of thirteen of the round tubes and twelve of the round tubes into boxes.

In this way, in some implementations, the automated round tube loading machine provides automatic grouping, stacking, and loading of round tubes used for holding yarn or other products into boxes in a manner that is not tedious and time consuming like manual grouping, stacking, and loading of the tubes.

FIGS. 1A-1D illustrate examples of round tubes 102 stacked in sets 104 of rows 106 in a box 108. The tubes 102 are usually made of cardboard or other suitable material. The tubes 102 usually have an opening that extends through from one end to the other end of the tubes 102.

The tubes 102 are usually used to hold yarn or other products (not shown). Before the tubes 102 are used for such purposes, the tubes 102 are usually manually loaded into boxes 108 for storage, transport, etc. For example, after the tubes 102 are manufactured, the tubes 102 are manually placed into the boxes 108 before usage.

Figure 1B:
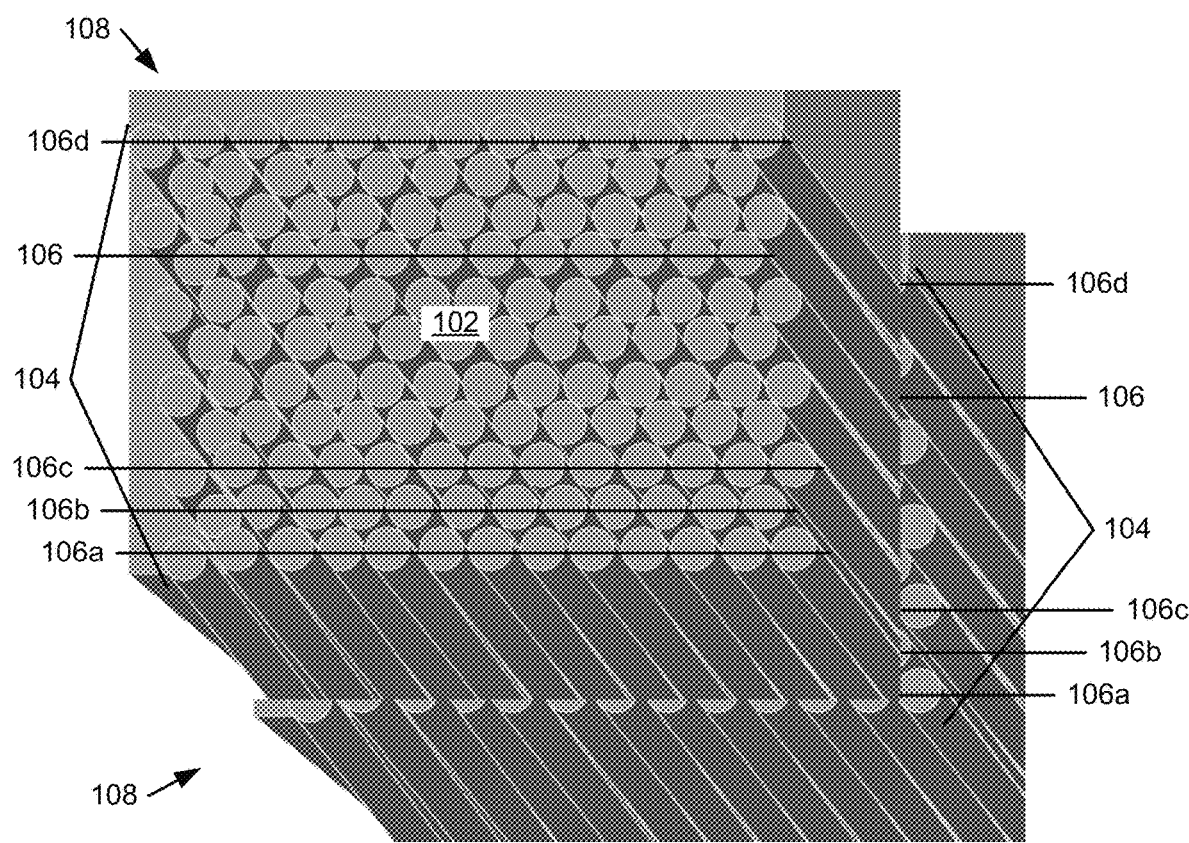
Figure 1C:
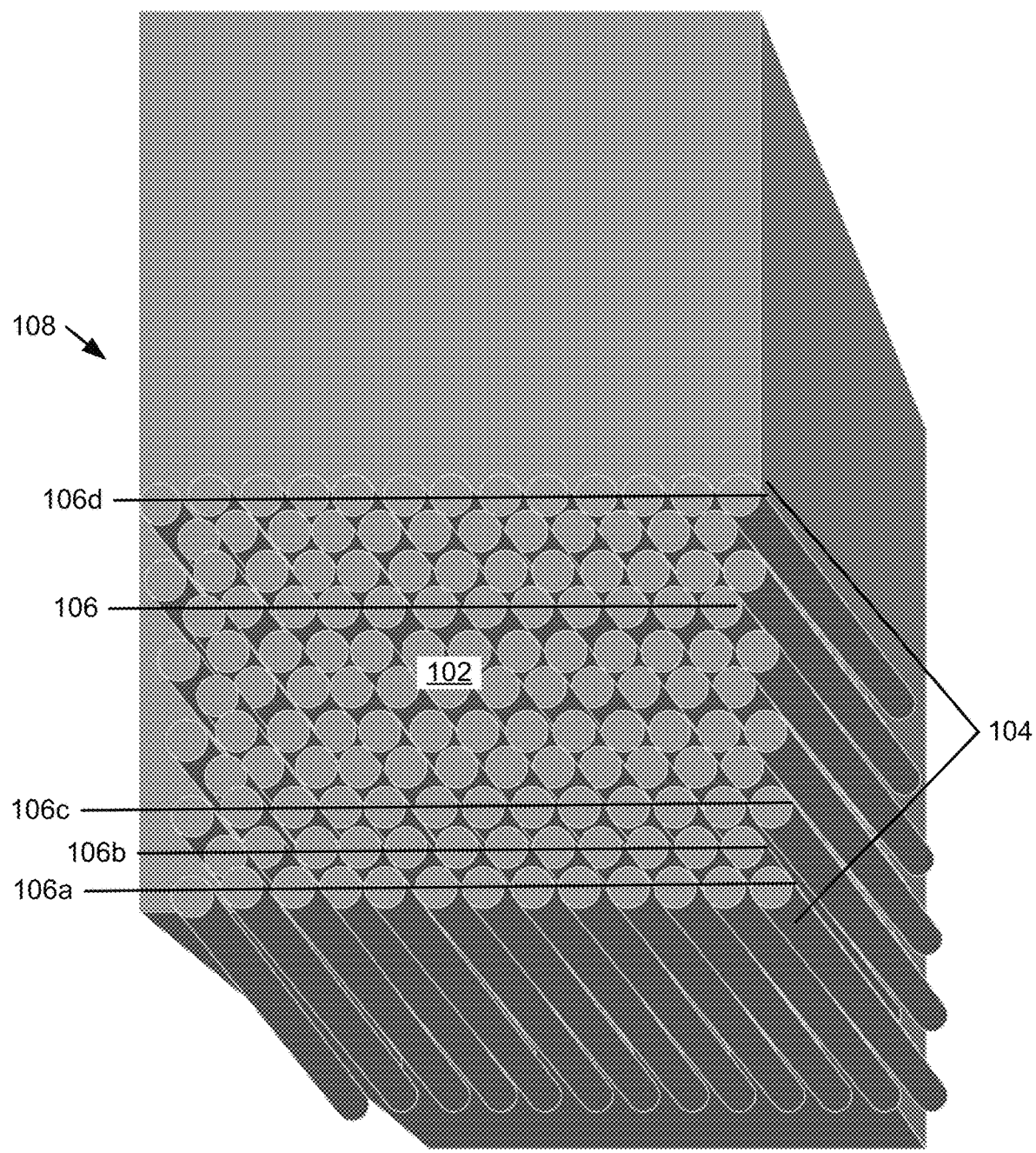
Figure 1D:
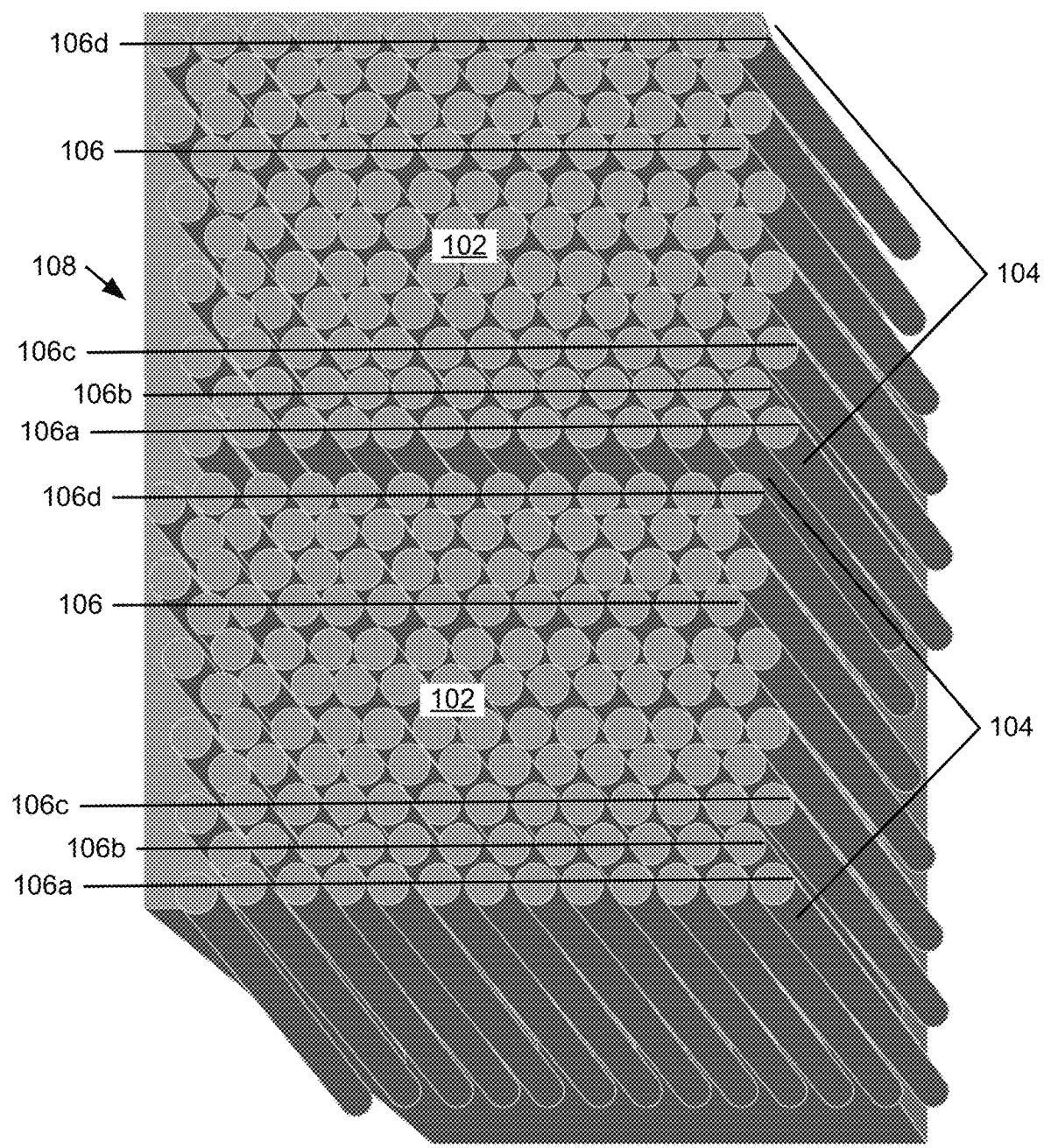

The tubes 102 are usually stacked in the boxes 108 in one set 104, as shown in FIG. 1A or 1C, or in two sets 104 of eleven rows 106 of the tubes 102 packed vertically, e.g. end to end as shown in FIG. 1B, or horizontally, e.g. side by side as shown in FIG. 1D. The stacked rows 106 usually start with a first or bottom row 106a of thirteen of the tubes 102.

A second row 106b of twelve of the tubes 102 is usually placed next to the first row 106a of tubes 102. A third row 106c of thirteen of the tubes 102 is usually placed next to the second row 106b of tubes 102. The rest of the rows 106 of tubes 102 are similarly stacked alternating between a row 106 of thirteen of the tubes 102 and a row 106 of twelve of the tubes 102 with the last or top row 106d having thirteen of the tubes 102.

The loading of the round tubes 102 into the boxes 108 in this manner is tedious and time consuming since the loading is done manually.

Figure 3A:
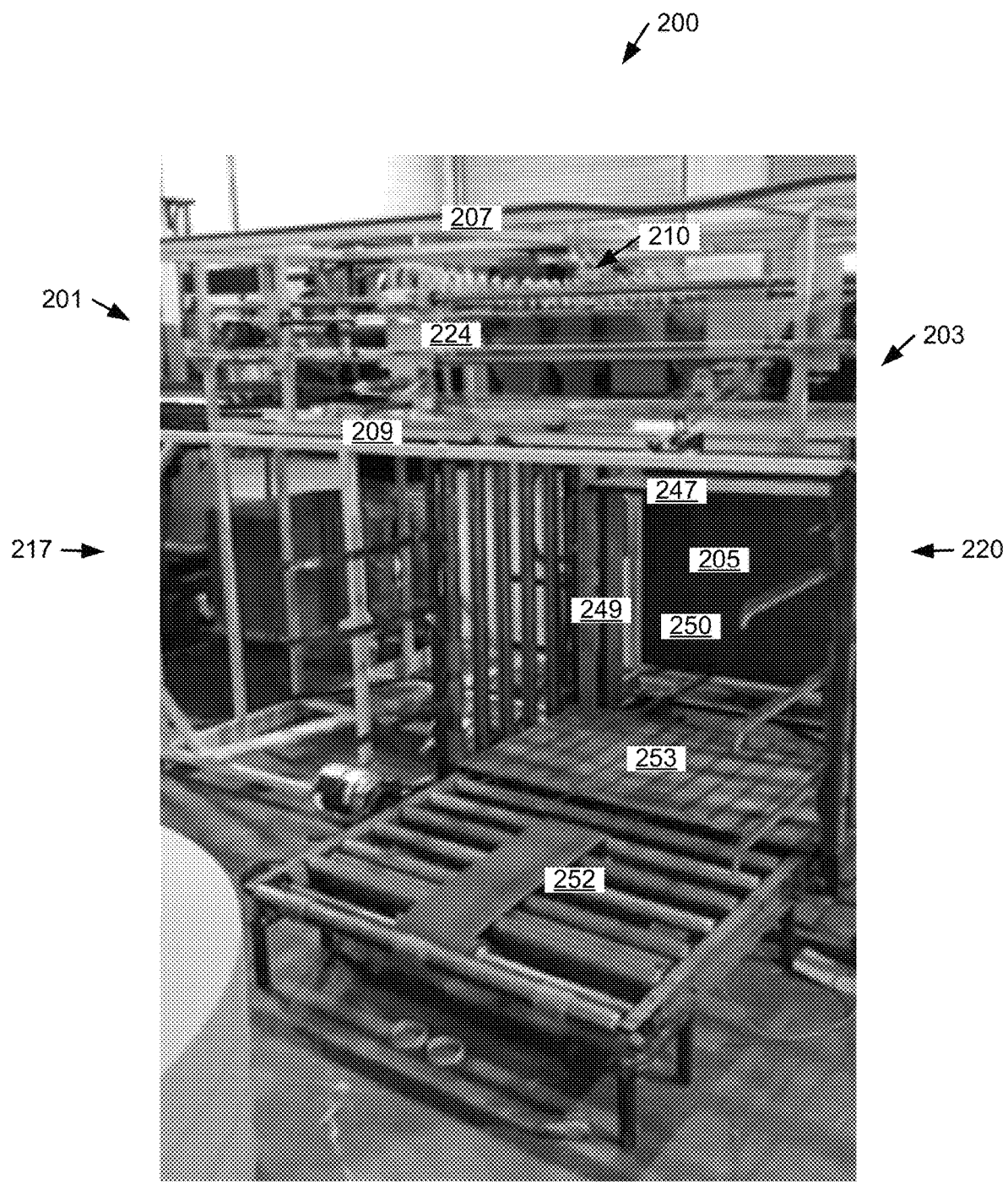
FIG. 3A illustrates a left side view of an implementation of the example automated round tube loading machine according to the present disclosure.
Figure 3B:
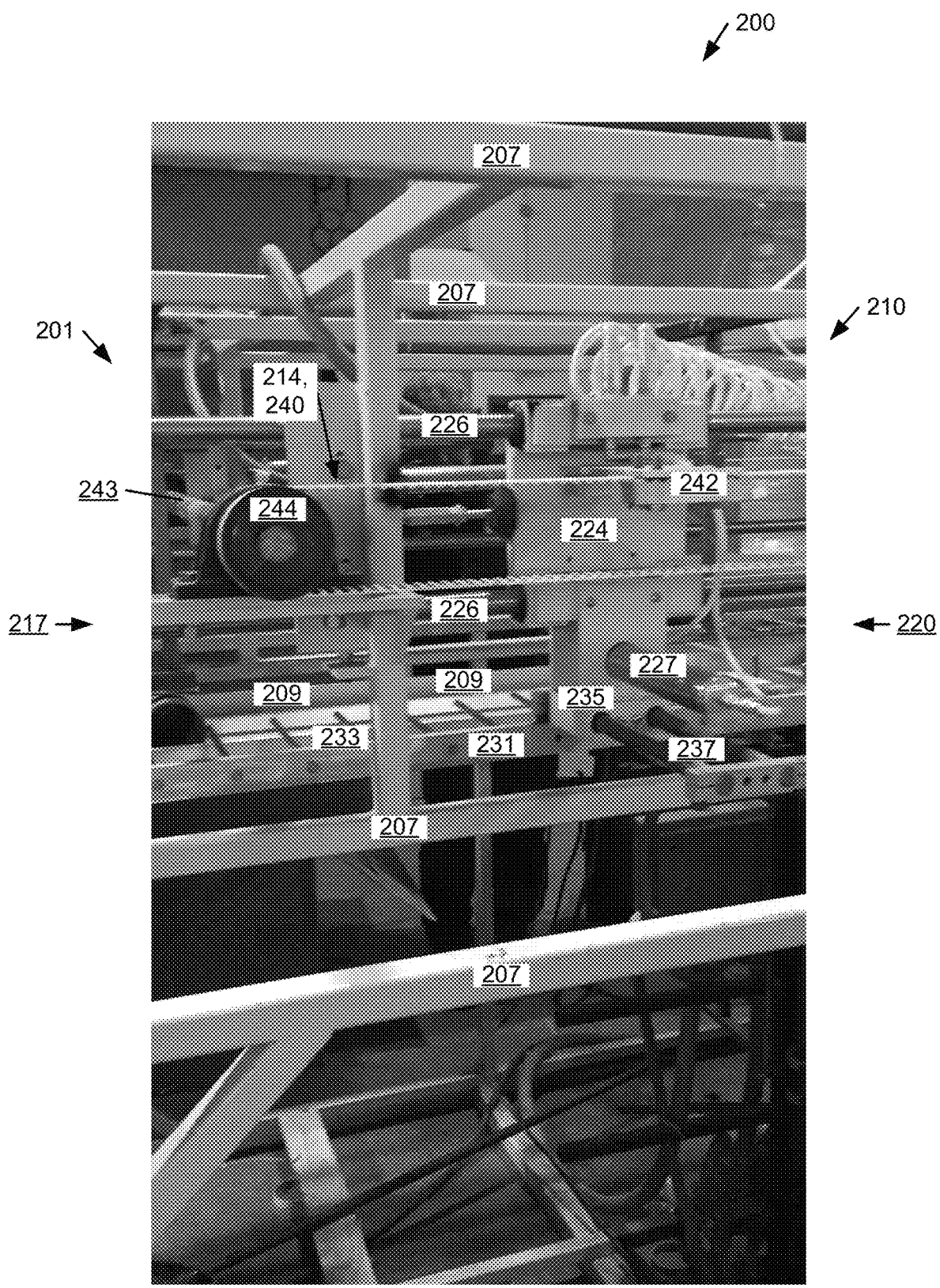
FIG. 3B illustrates another left side view of an implementation of the example automated round tube loading machine according to the present disclosure.
Figure 3C:
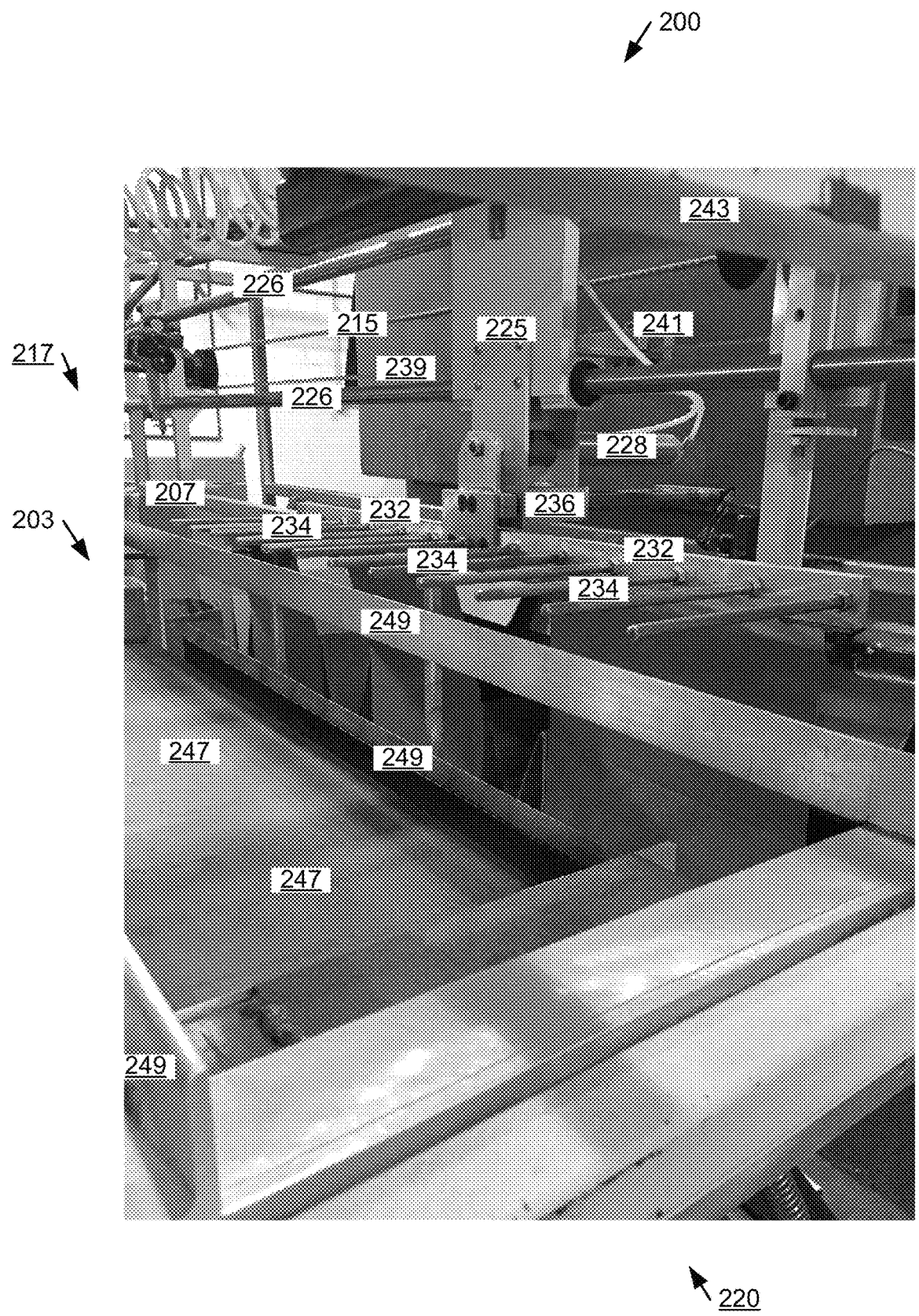
FIG. 3C illustrates a back side view of an implementation of the example automated round tube loading machine according to the present disclosure.
Figure 3D:
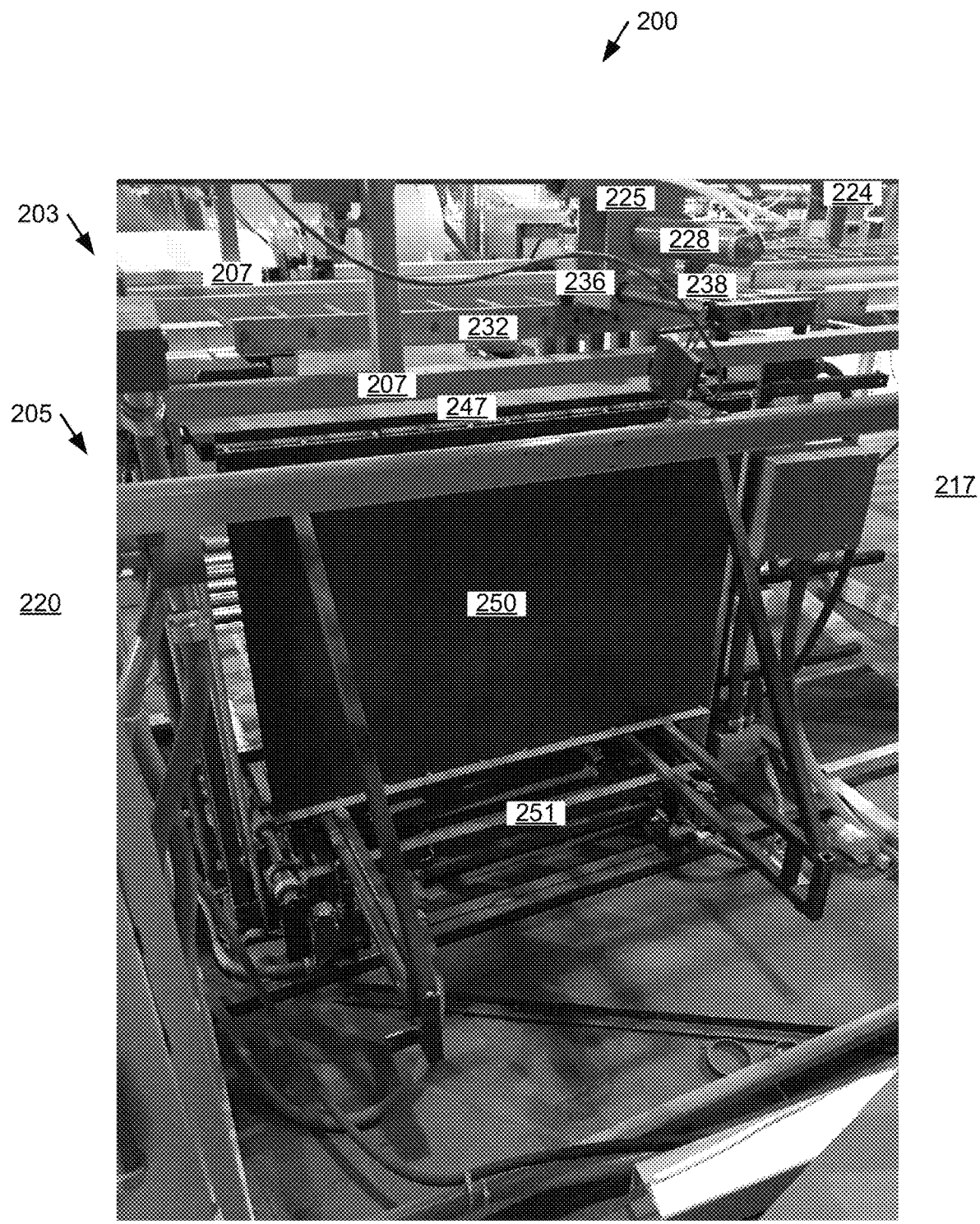
FIG. 3D illustrates a right side view of an implementation of the example automated round tube loading machine according to the present disclosure.
Figure 3E:
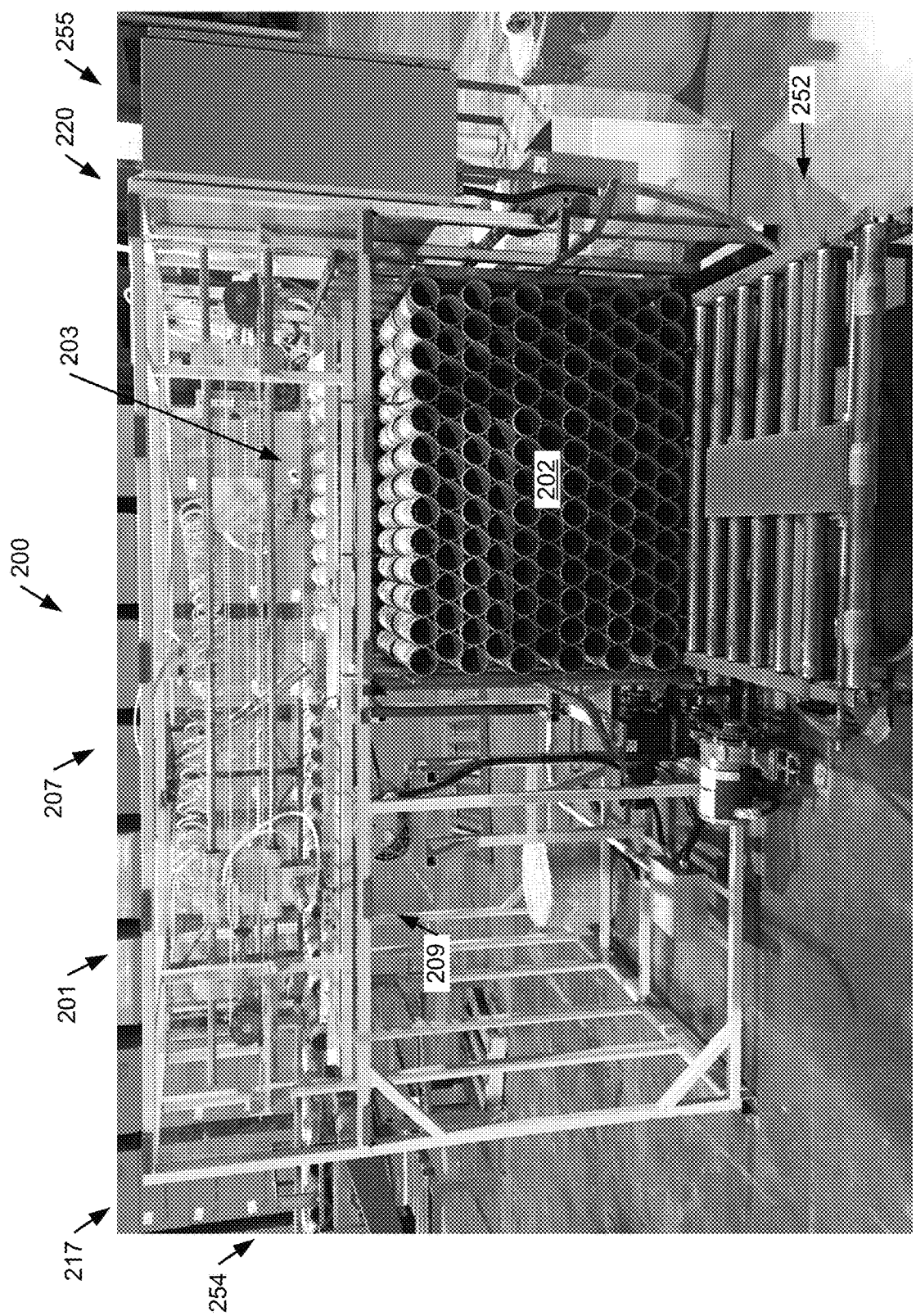
FIG. 3E illustrates an overall left side view of an implementation of the example automated round tube loading machine according to the present disclosure.
Figure 3F:
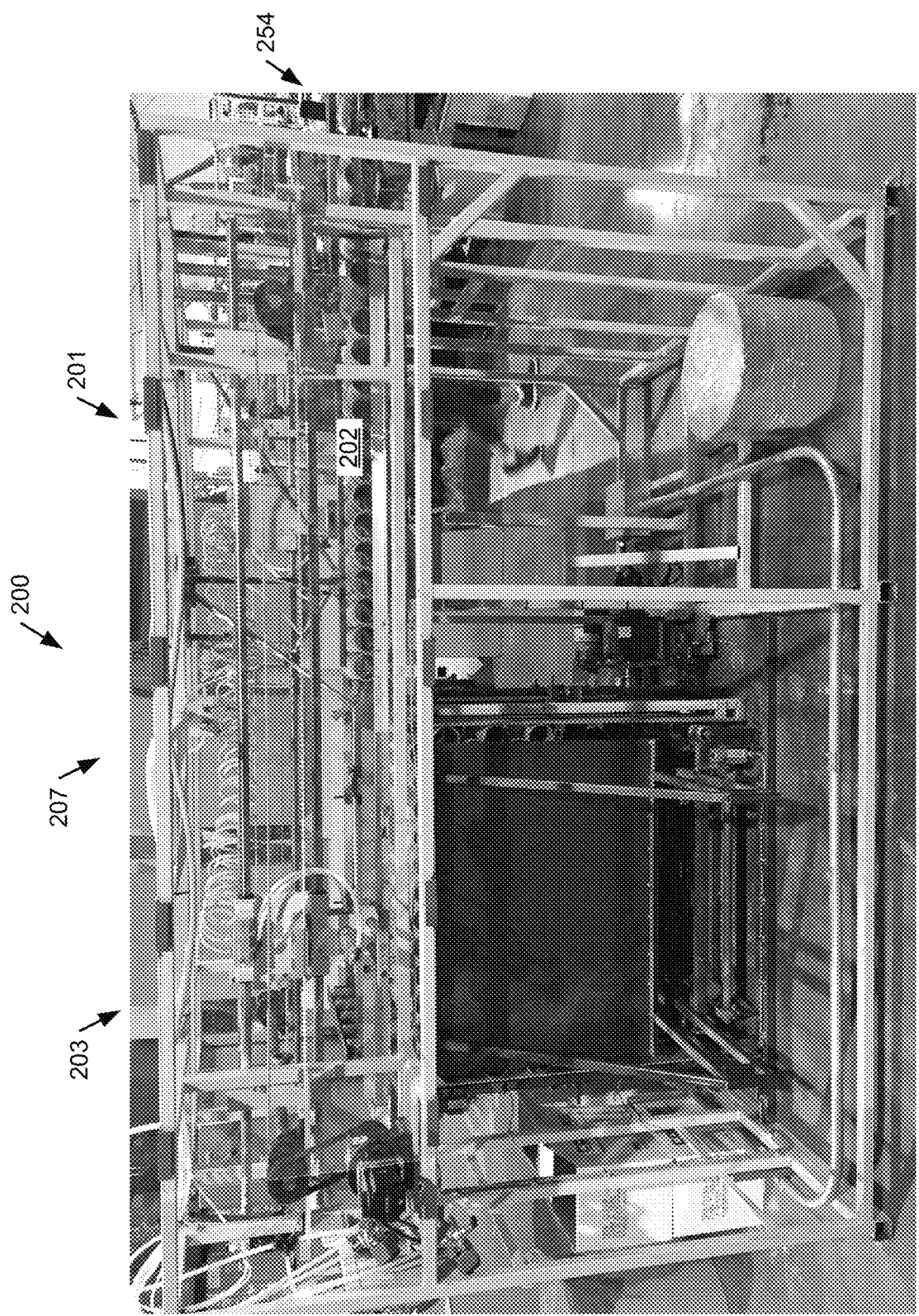
FIG. 3F illustrates an overall right side view of an implementation of the example automated round tube loading machine according to the present disclosure.

As shown in FIGS. 3E and 3F, in some implementations, the automated round tube loading machine 200 comprises a tube pickup mechanism 201, a tube stacking mechanism (or "elevator") 203, and a tube loading mechanism (or "box plunger") 205. In some implementations, the automated round tube loading machine 200 may further comprise a front side conveyor 254 and/or a back side conveyor 252. In some implementations, the automated round tube loading machine 200 may further comprise a computer system 255 or similar component such as a controller, control circuitry, etc.

In some implementations, one or more of the components of the automated round tube loading machine 200 are mounted, connected, and/or otherwise attached by a steel frame or similar structure 207.

Figure 2A:
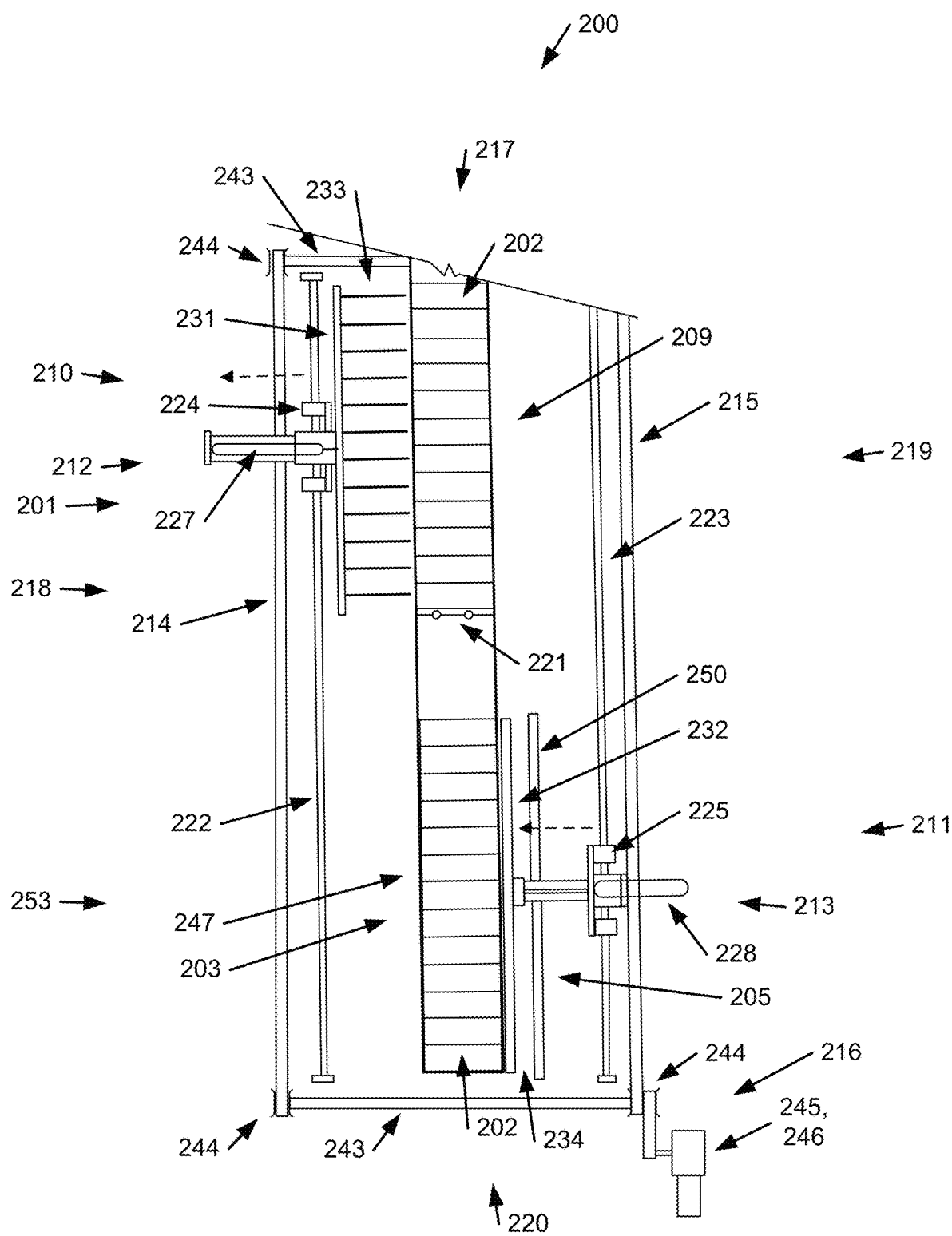
FIG. 2A illustrates a top view schematic representation of an implementation of an example automated round tube loading machine according to the present disclosure.
Figure 2B:
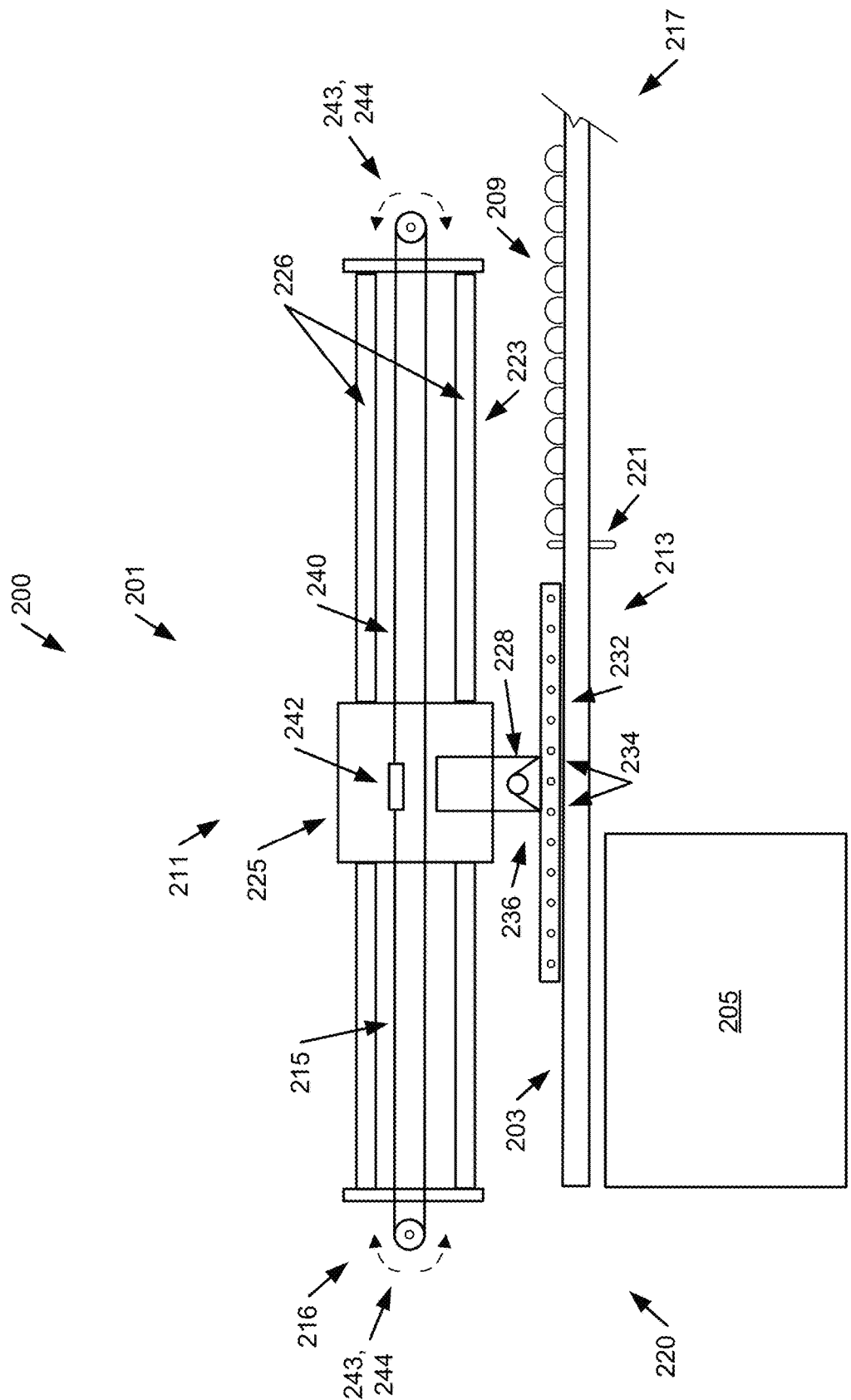
FIG. 2B illustrates a right side schematic representation of an implementation of the example automated round tube loading machine according to the present disclosure.

As shown in FIGS. 2A, 2B, and 3B, in some implementations, the tube pickup mechanism 201 comprises a tube receiver 209, left and right side main track assemblies 210, 211, left and right side secondary track assemblies 212, 213, left and right side timing belts 214, 215, and a timing belt drive mechanism 216.

In some implementations, the tube pickup mechanism 201 is configured to group a plurality of round tubes into a row for stacking multiple rows of the tubes into sets for loading into boxes. For example, in some implementations, the tube pickup mechanism 201 is configured to alternatingly group thirteen of the round tubes into a row and twelve of the round tubes into a row for stacking of the alternating rows of tubes for loading into boxes.

In some implementations, the "round tubes" or "tubes" described herein with respect to the automated round tube loading machine 200 may be the same or similar to the above described round tubes 102. In some implementations, such round tubes or tubes may be any suitable, size, shape, or other configuration. Other examples of such tubes 202 are shown in FIGS. 2A, 3E-3F and 4A-4Q with respect to the description of the automated round tube loading machine 200.

In some implementations, the "boxes" described herein with respect to the automated round tube loading machine 200 may be the same or similar to the above described boxes 108. In some implementations, such boxes may be any suitable, size, shape, or other configuration.

In some implementations, the tube receiver 209 is configured to receive a plurality of round tubes. As shown in FIGS. 2A, 2B, and 3B, in some implementations, the tube receiver 209 comprises an area of the automated round tube loading machine 200 configured to hold a plurality of tubes 202 to be captured or secured in a group (or "picked up") by the automated round tube loading machine 200. For example, in some implementations, the tube receiver 209 may comprise a horizontal surface to hold a plurality of tubes 202 to be picked up. In some implementations, the tube receiver 209 may further comprise one or more vertical sides to keep the tubes 202 on the horizontal surface.

In some implementations, the tube receiver 209 extends at least part of the length of the automated round tube loading machine 200. For example, in some implementations, the tube receiver 209 extends from the front side 217 to the elevator 203 of the automated round tube loading machine 200.

As shown in FIG. 3E, in some implementations, the tube receiver 209 is configured to receive tubes from a conveyor, such as the front side conveyor 254 described below. In some implementations, the tube receiver 209 is configured to receive tubes that are manually placed on the tube receiver 209. In some implementations, the tube receiver 209 is configured to receive tubes in any other suitable manner.

Figure 4A:
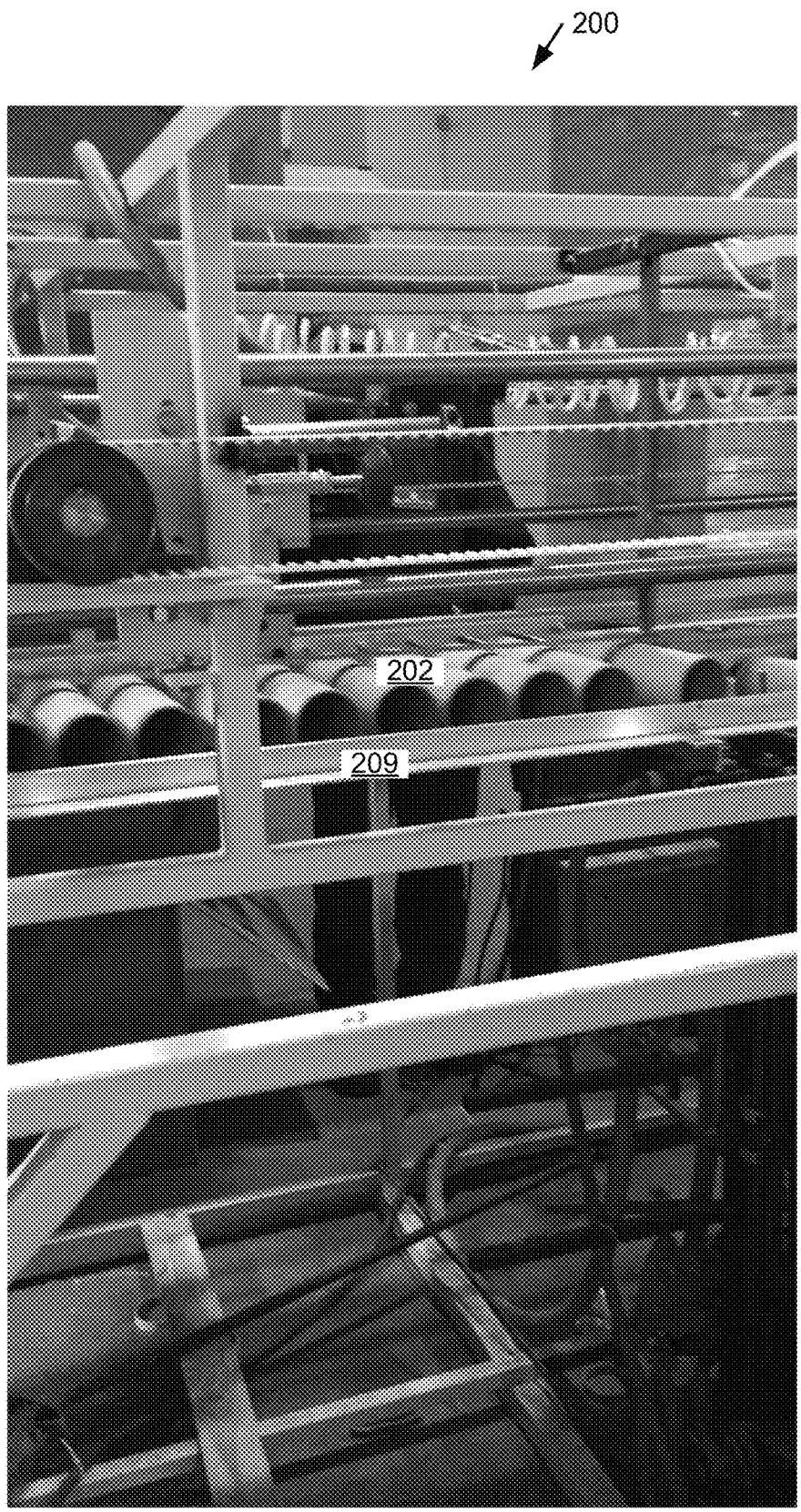
FIGS. 4A and 4B illustrate implementations of example tube receiving operations by the example automated round tube loading machine according to the present disclosure.
Figure 4B:
Figure 4C:
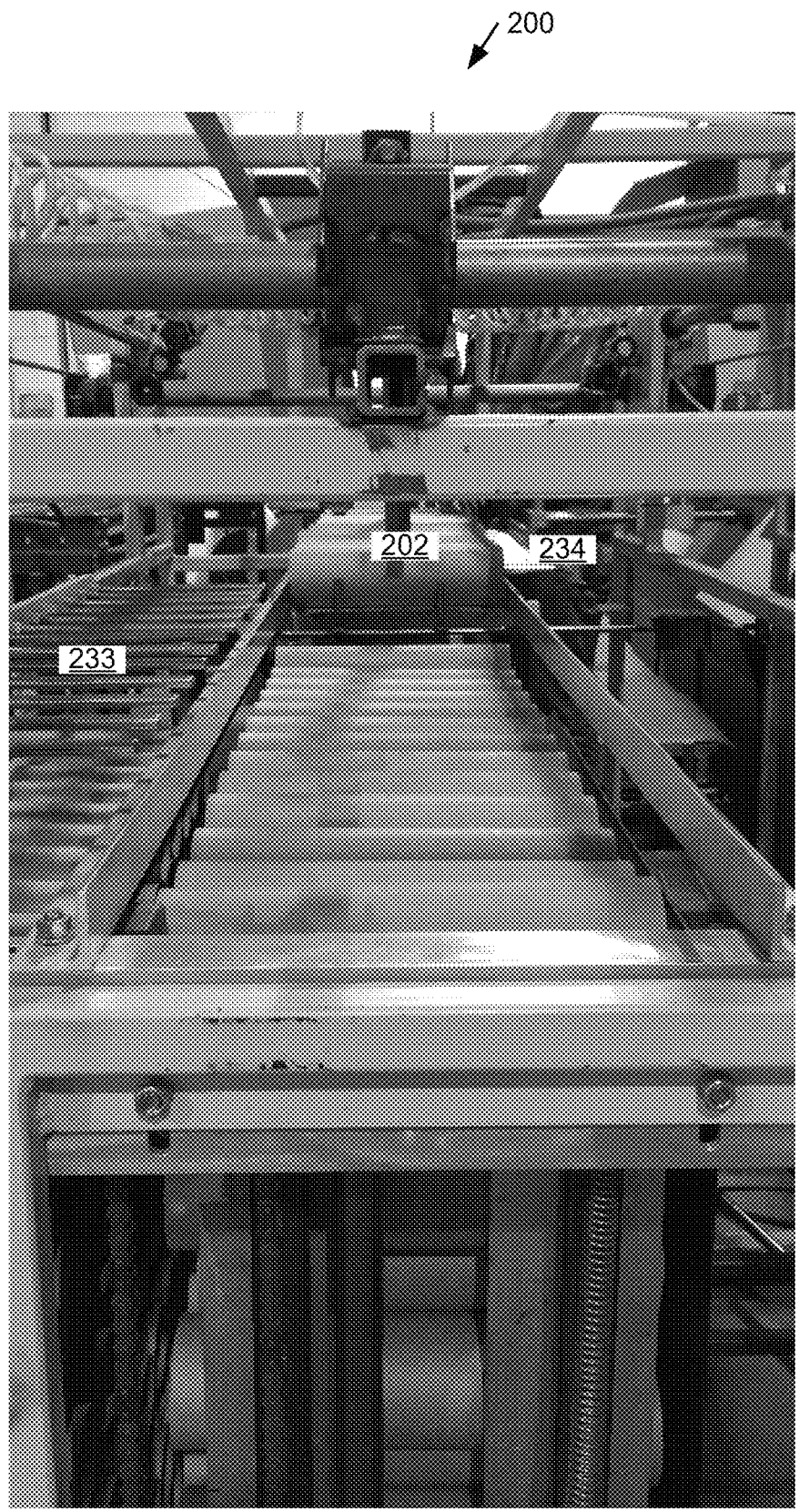
FIGS. 4C and 4D illustrate implementations of example tube pick up operations by the example automated round tube loading machine according to the present disclosure.
Figure 4D:
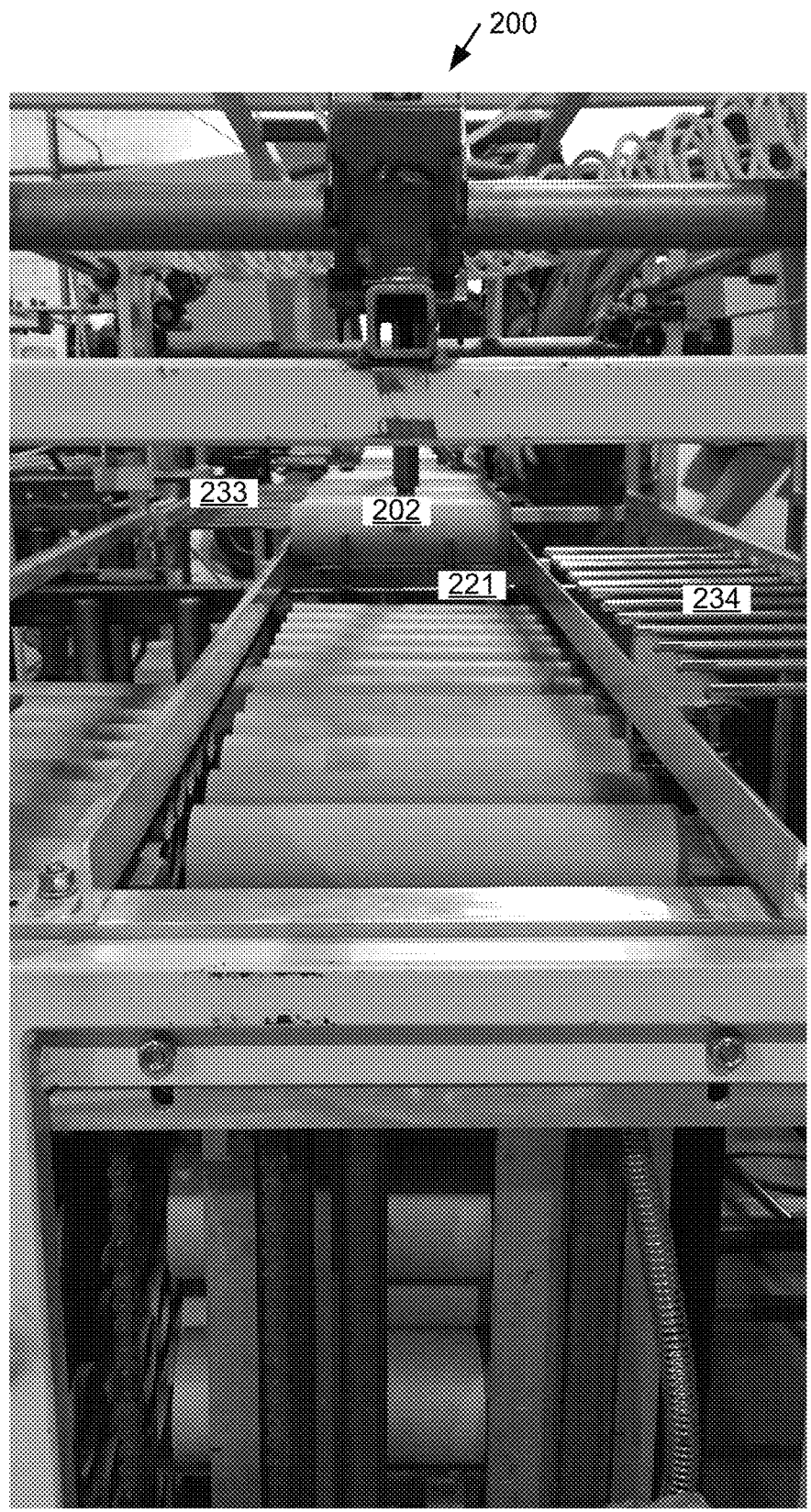
Figure 4E:
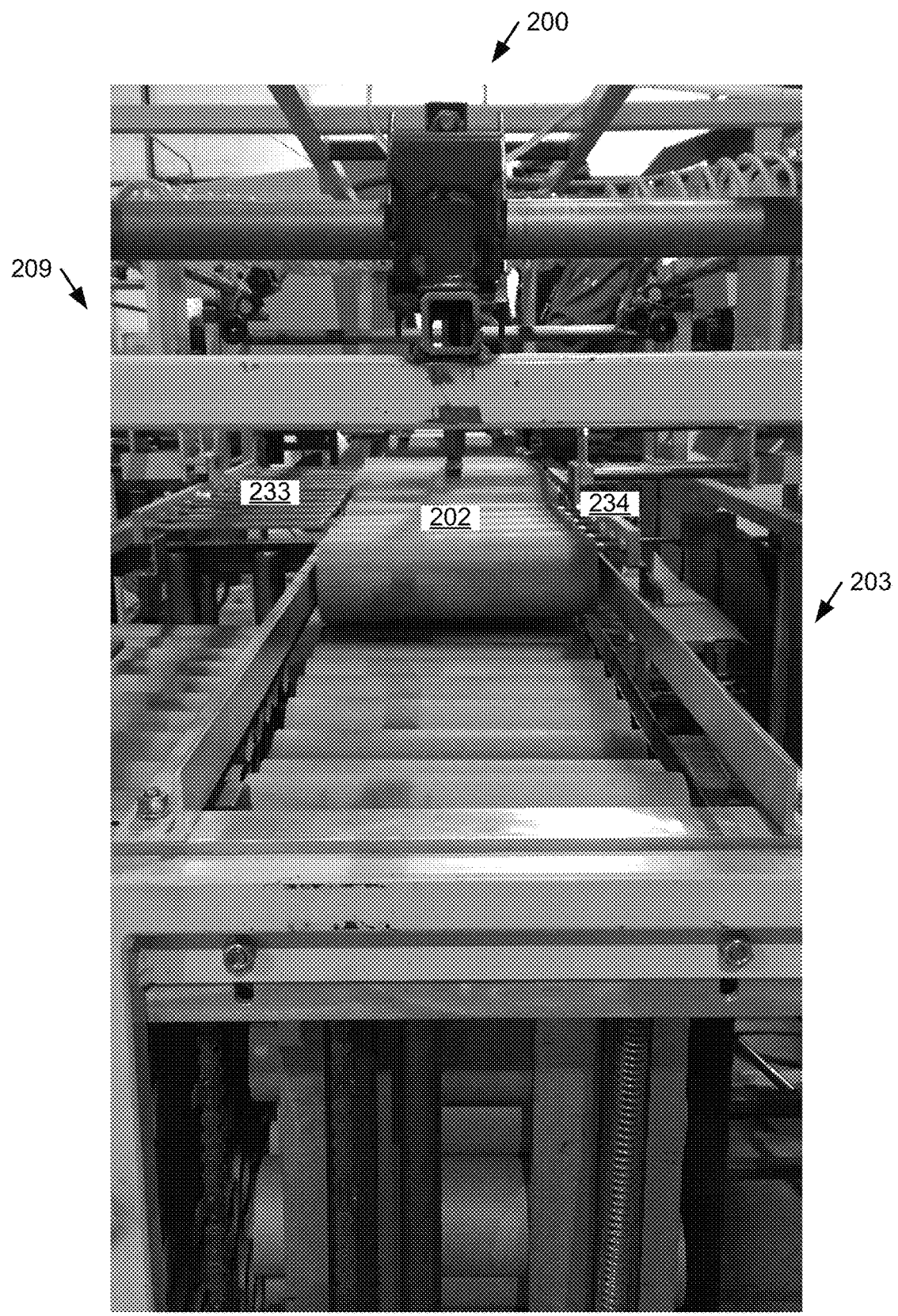
FIGS. 4E and 4F illustrate implementations of example tube moving operations by the example automated round tube loading machine according to the present disclosure.
Figure 4F:
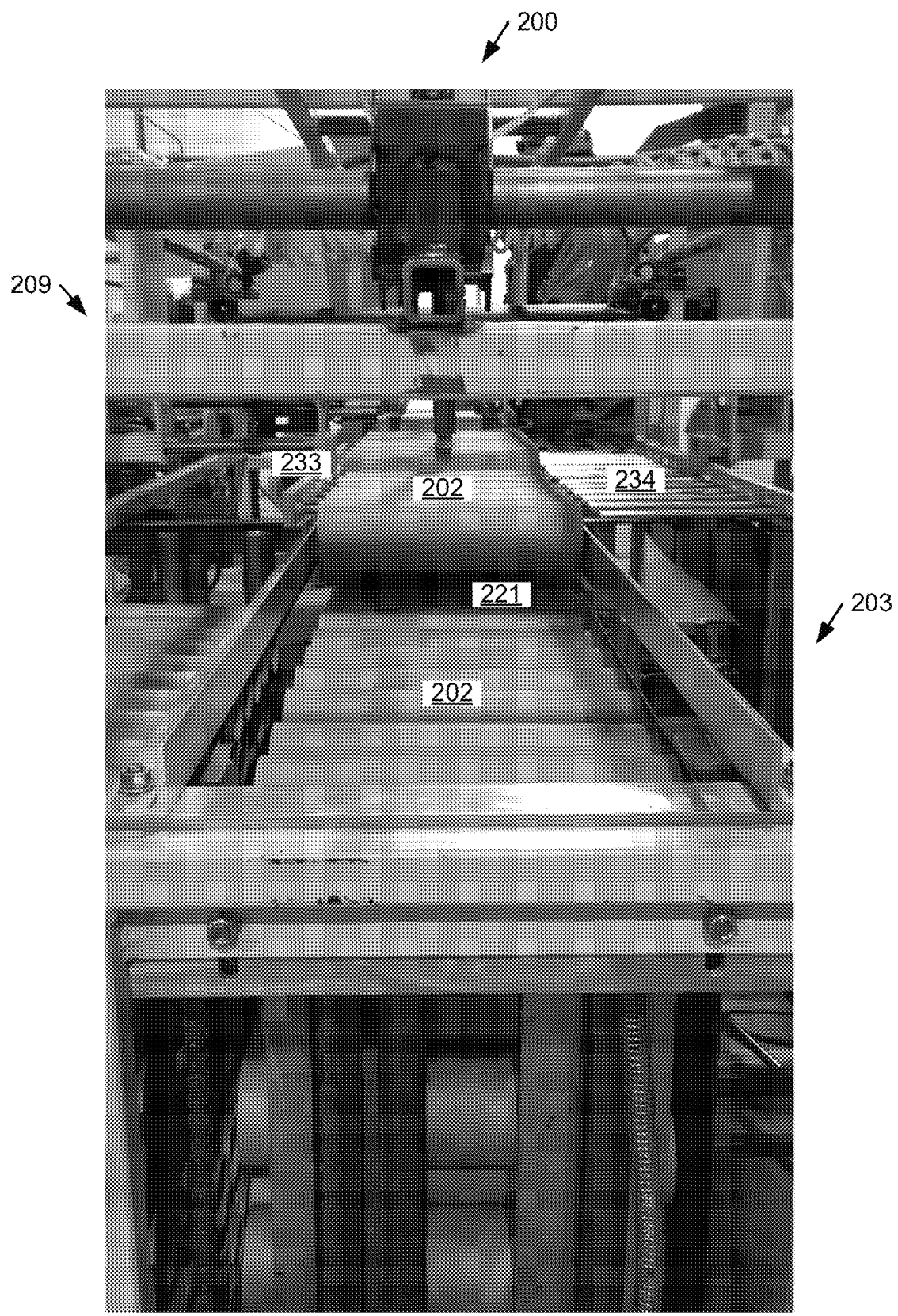
Figure 4G:
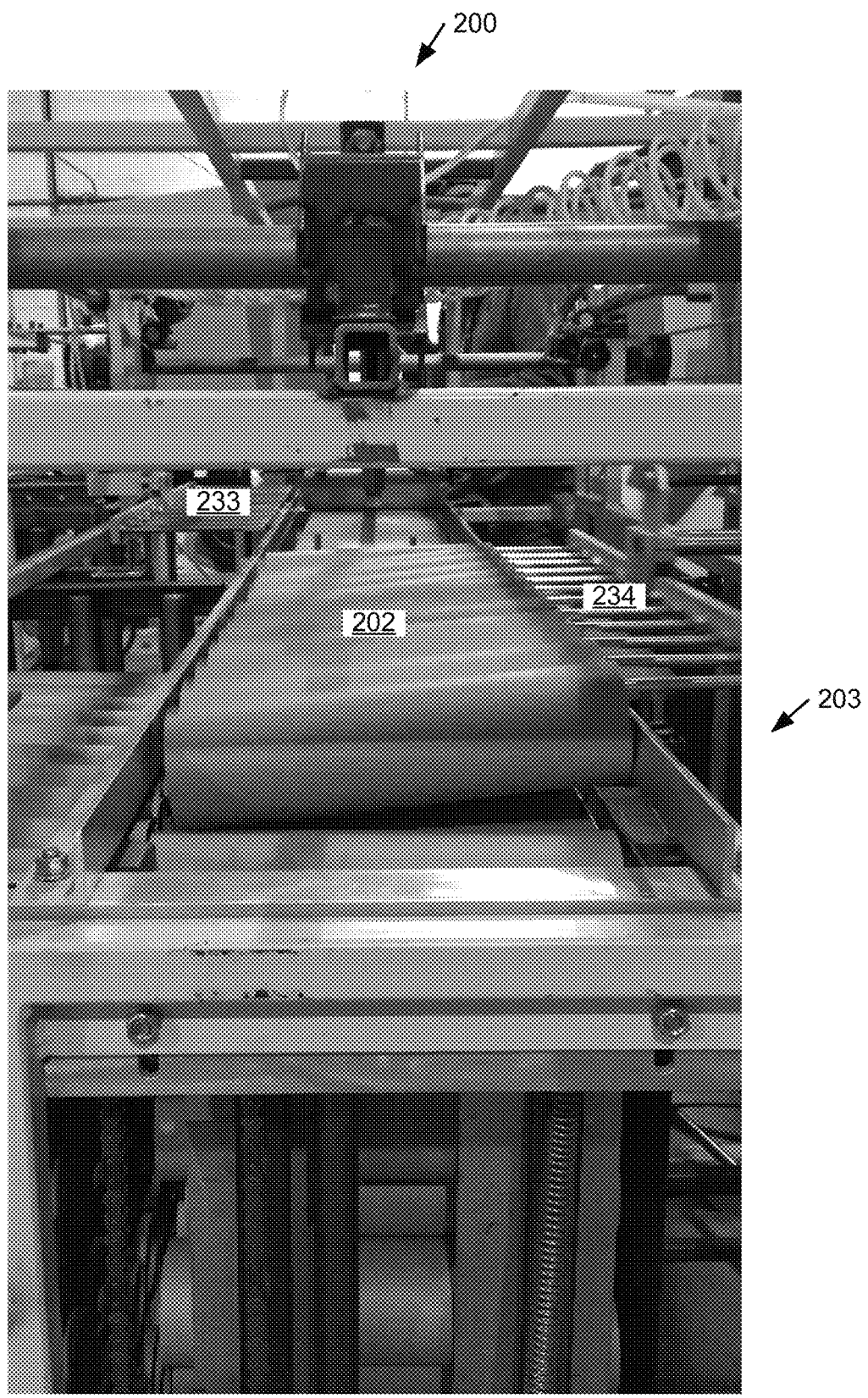
FIGS. 4G and 4H illustrate implementations of example tube drop off operations by the example automated round tube loading machine according to the present disclosure.
Figure 4H:
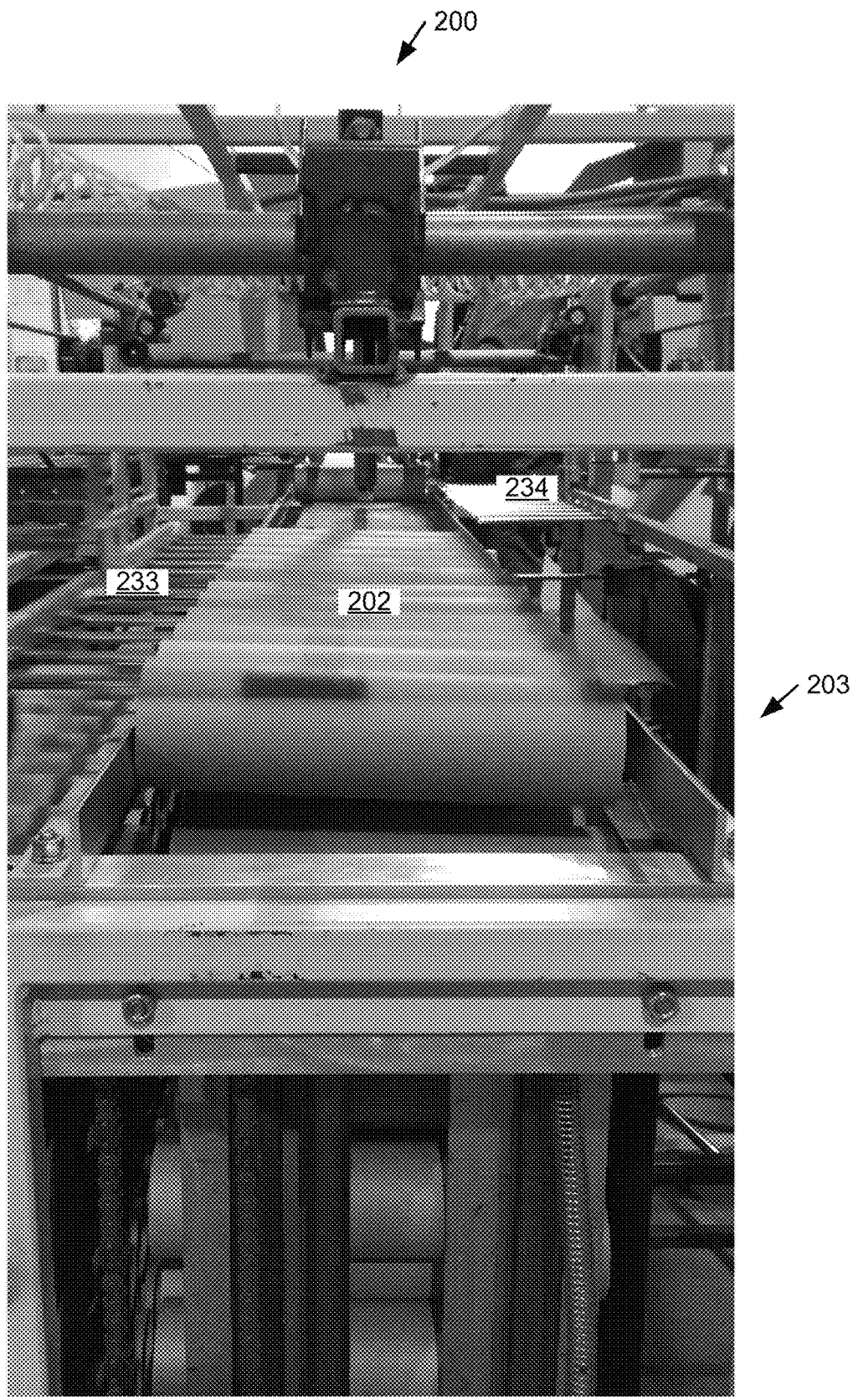
Figure 4I:
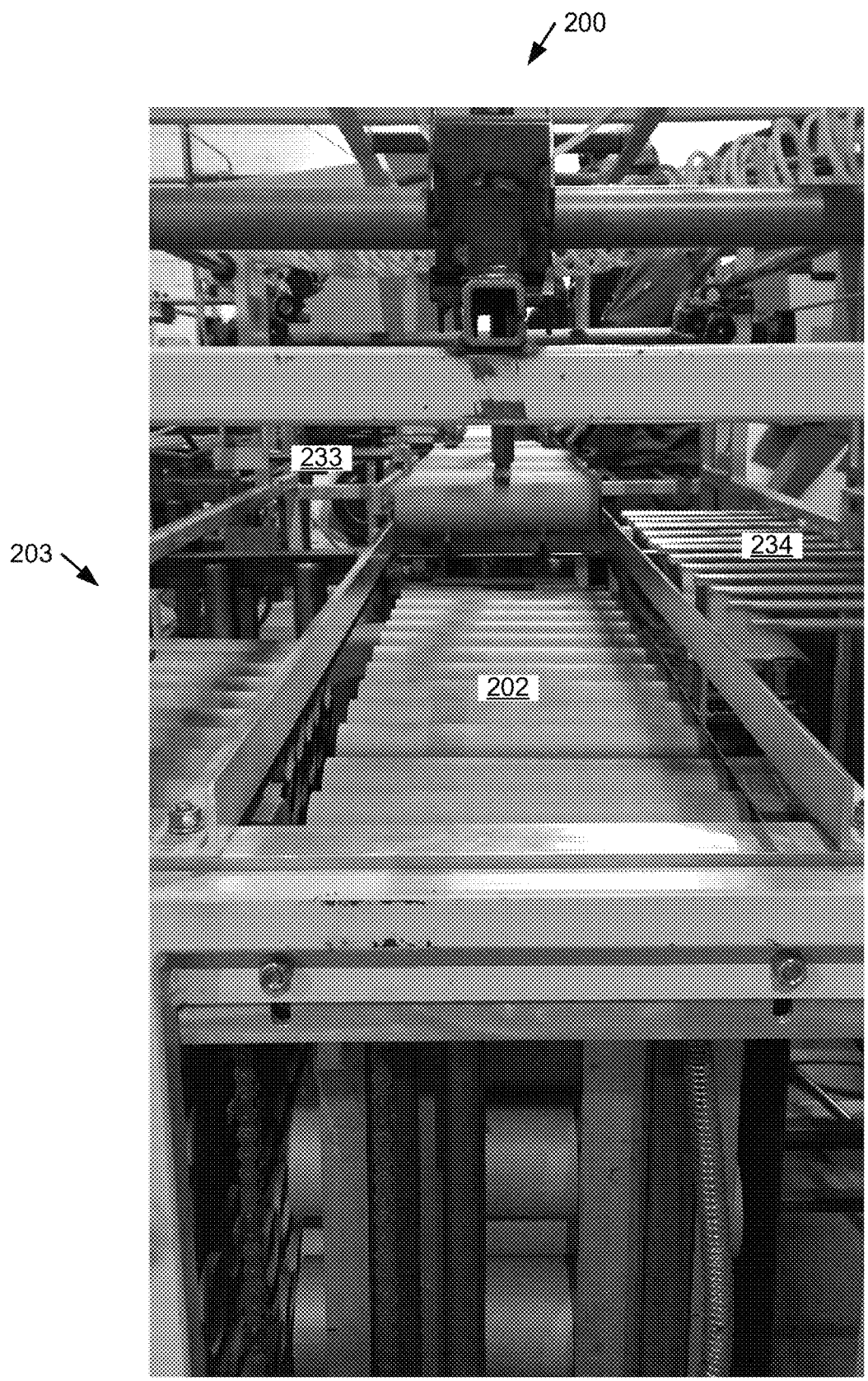
FIGS. 4I and 4J illustrate implementations of example tube stacking operations by the example automated round tube loading machine according to the present disclosure.
Figure 4J:
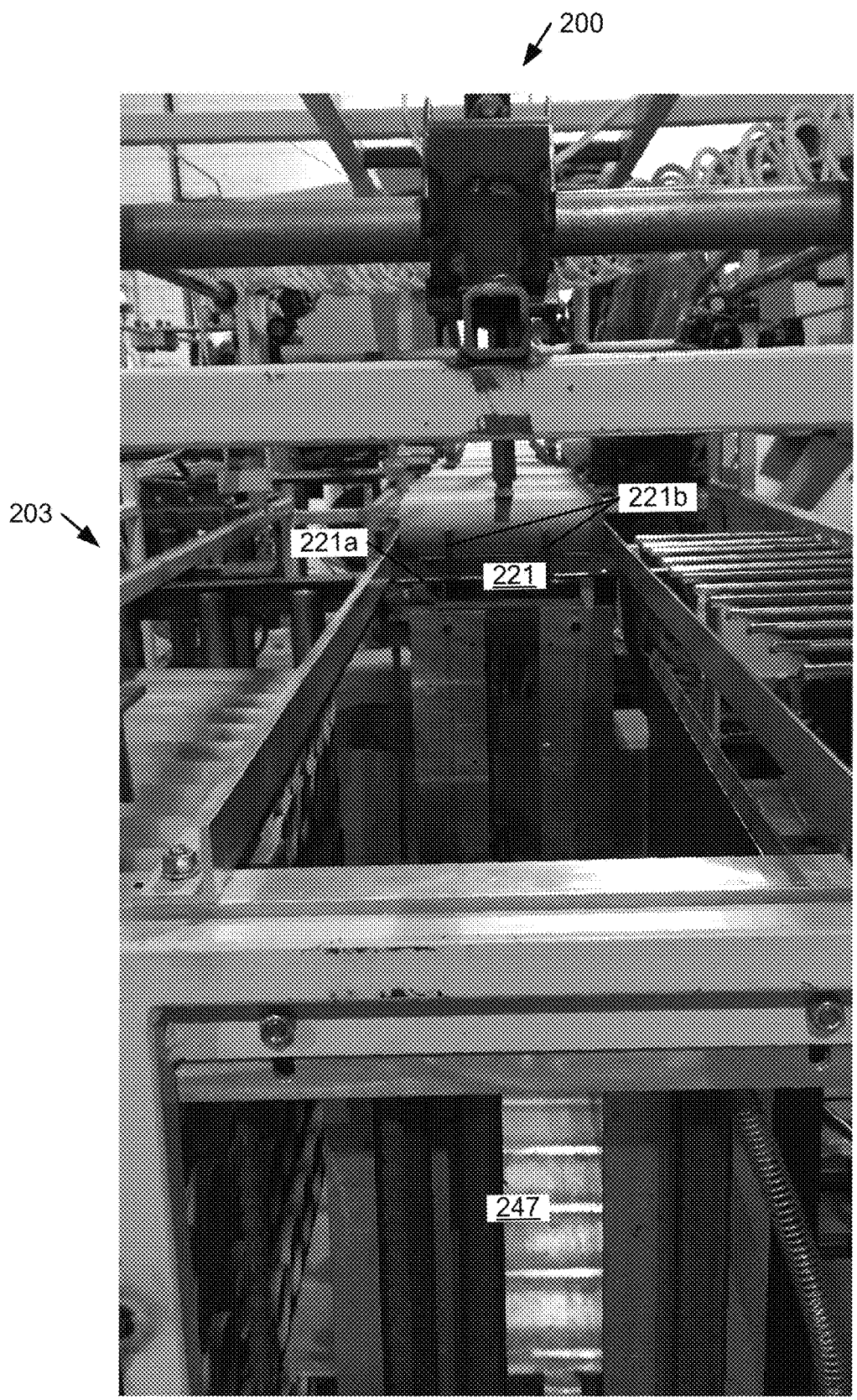
Figure 4K:
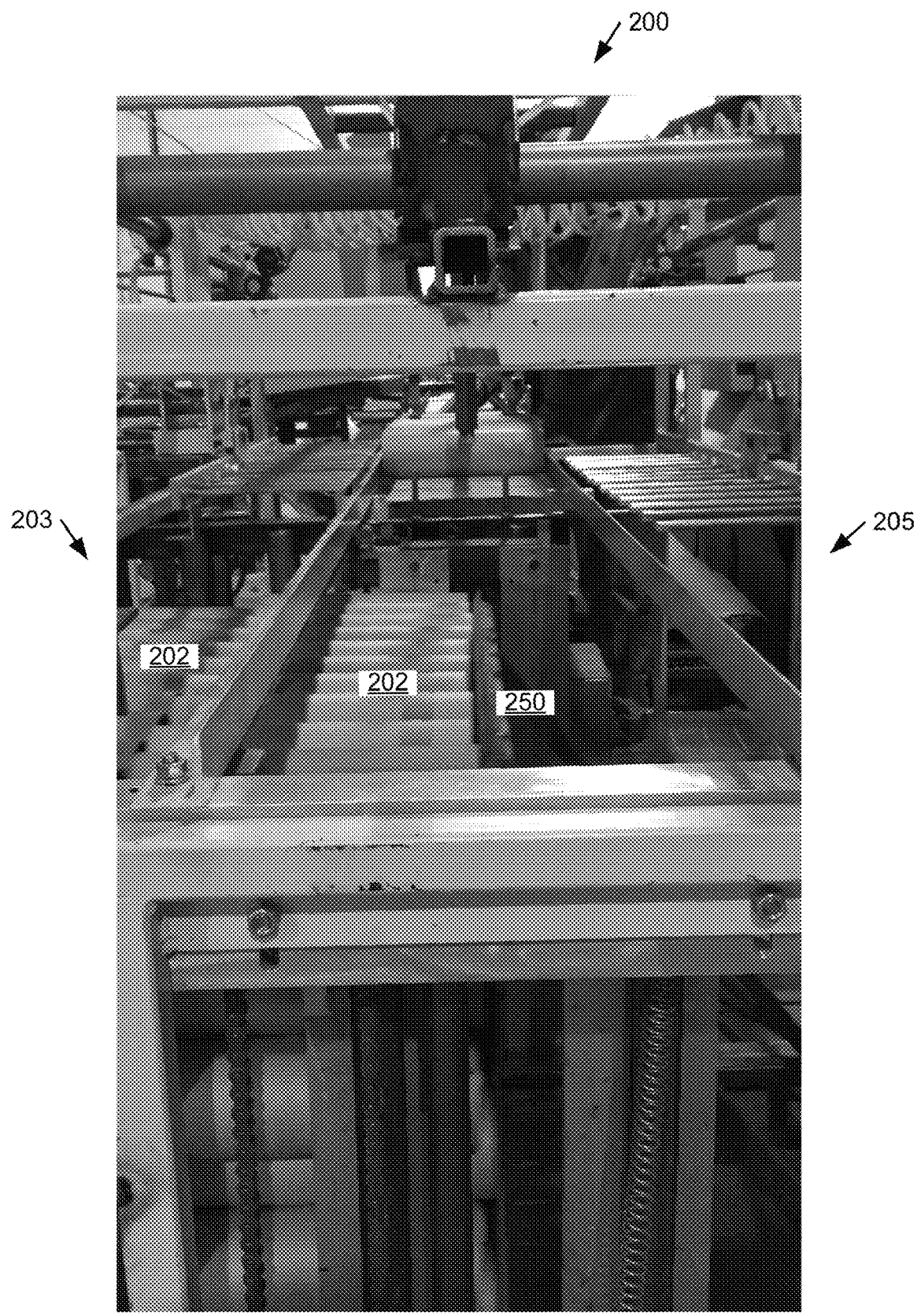
FIGS. 4K-4M illustrate implementations of example tube loading operations by the example automated round tube loading machine according to the present disclosure.
Figure 4L:
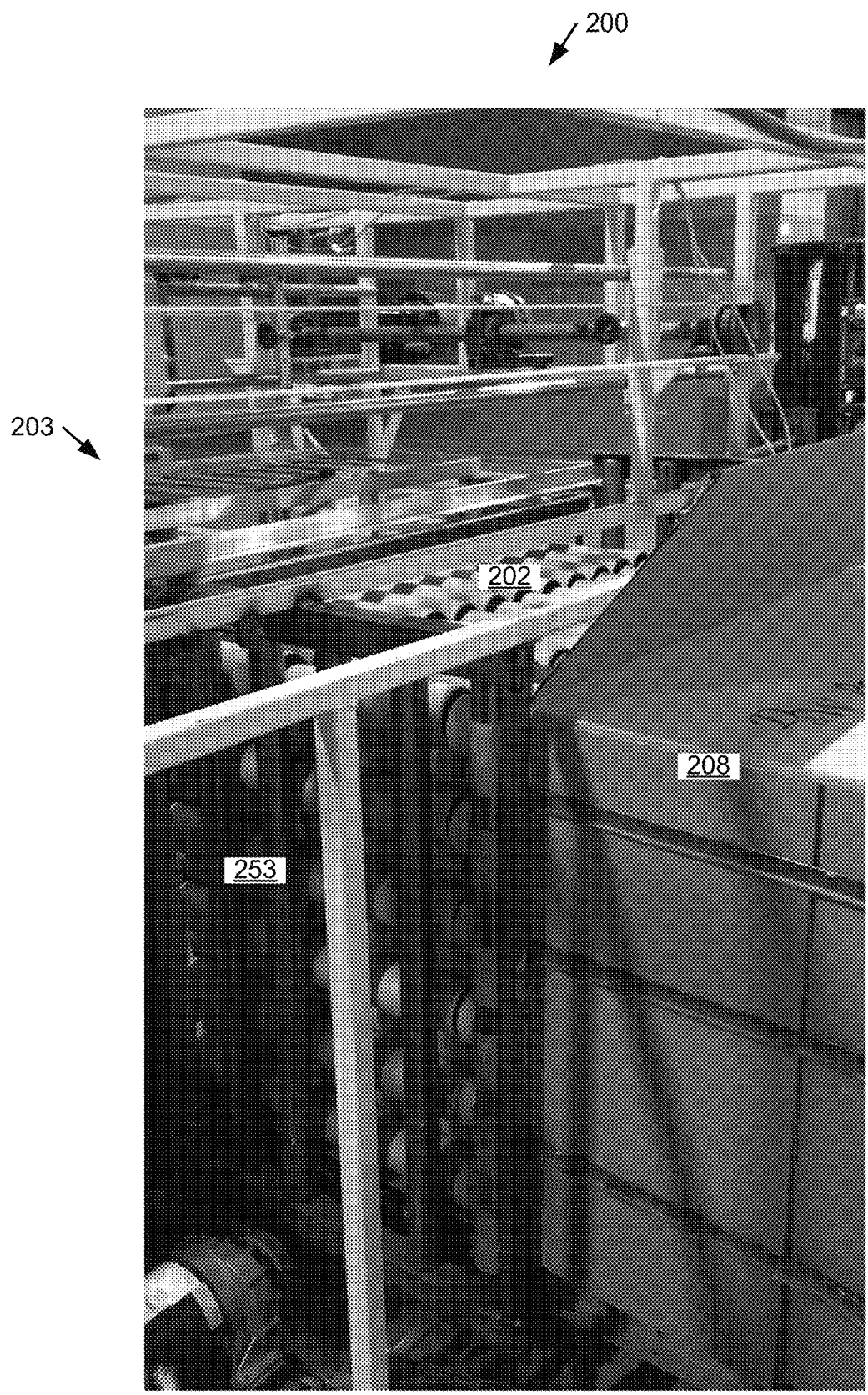
Figure 4M:
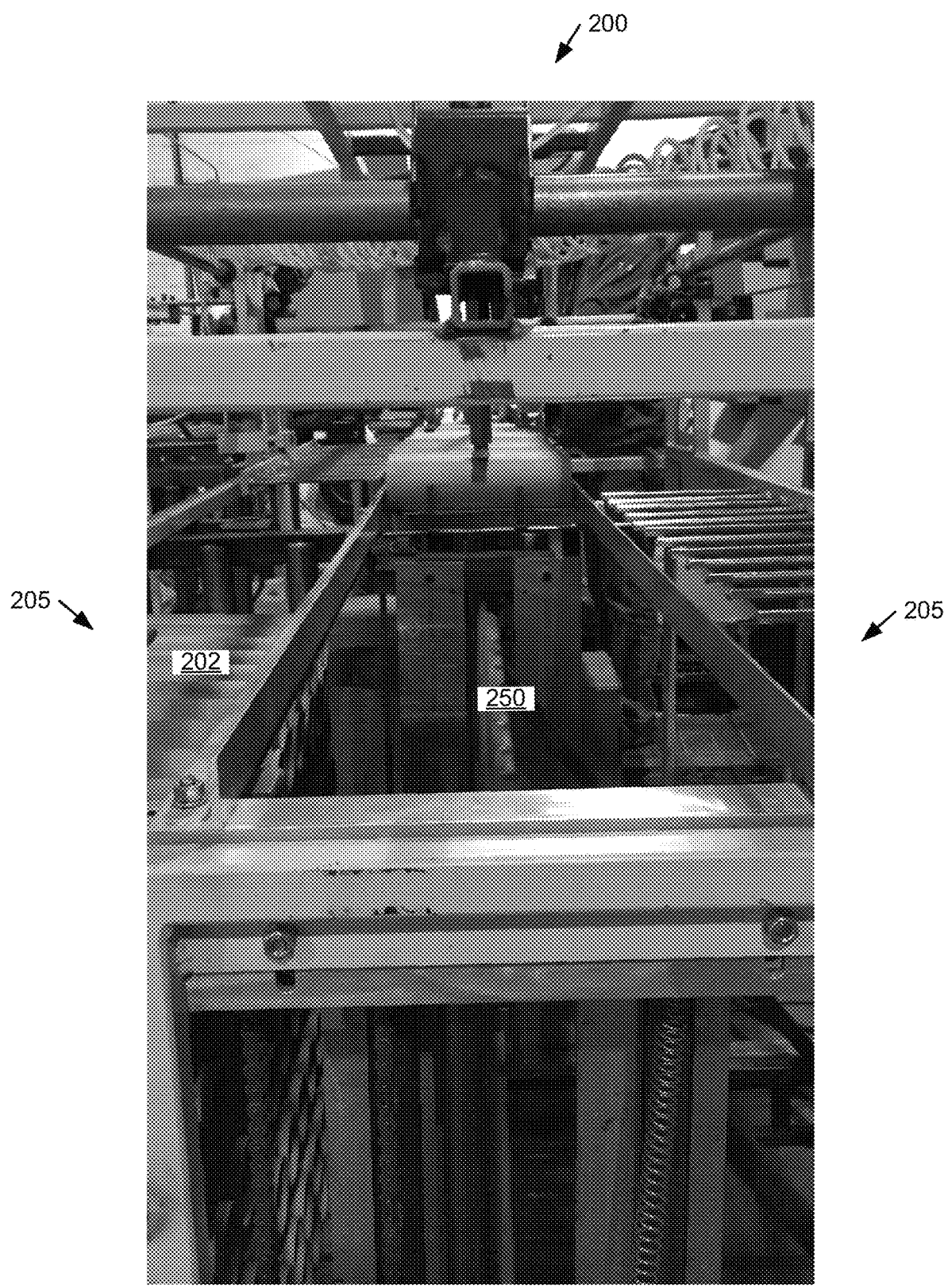
Figure 4N:
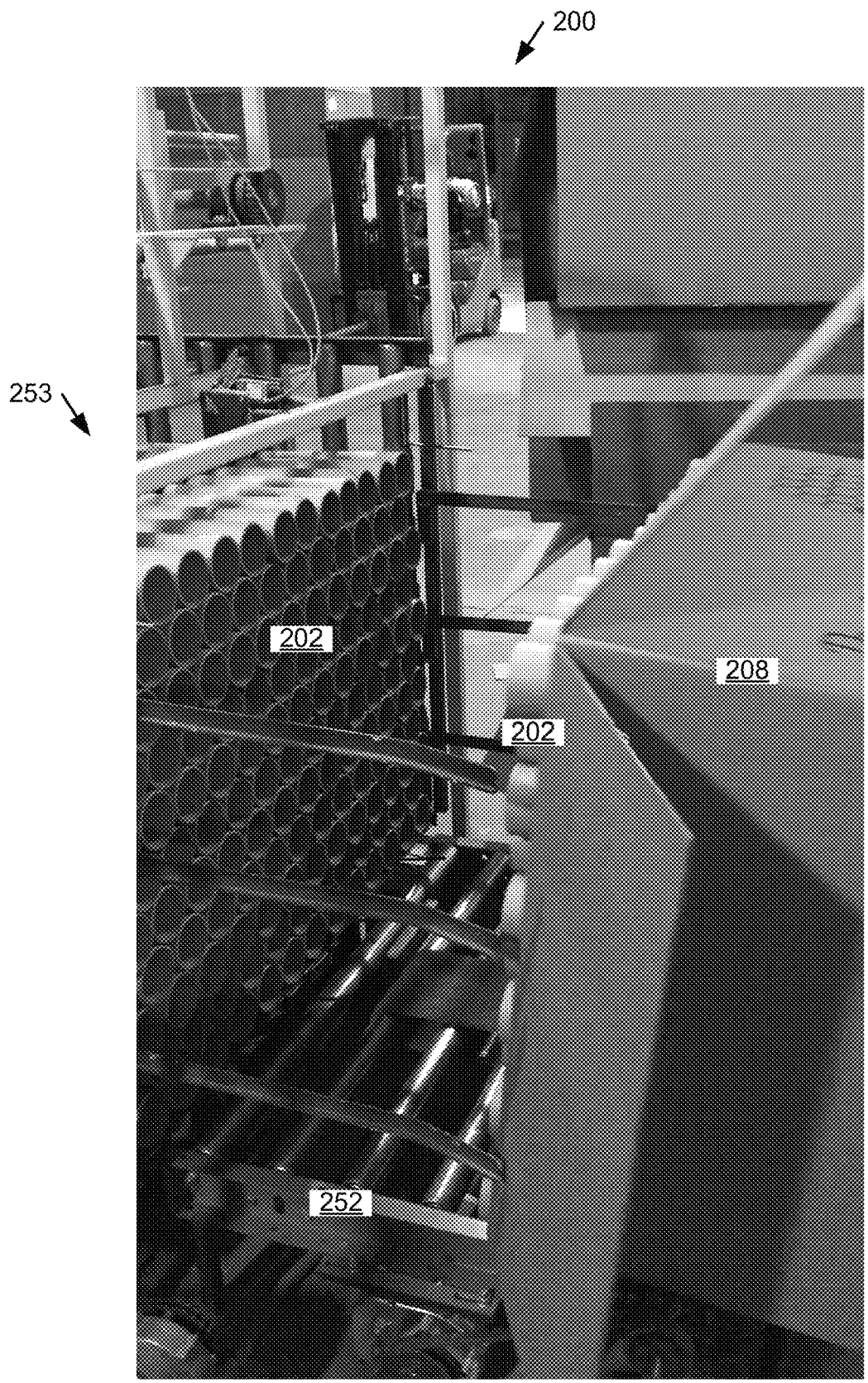
FIGS. 4N and 4O illustrate implementations of example loaded box conveying operations by the example automated round tube loading machine according to the present disclosure.
Figure 4O:
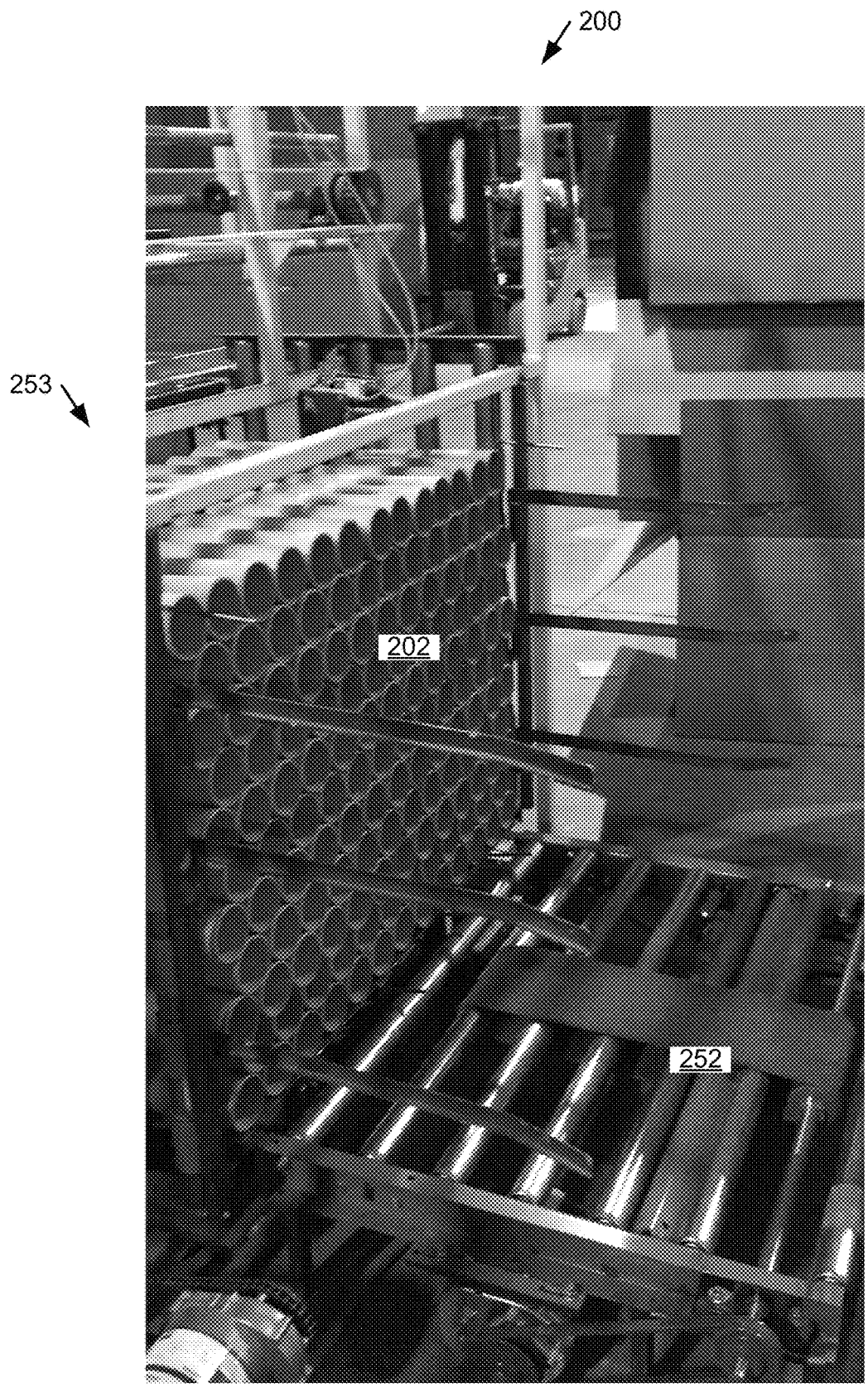
Figure 4P:
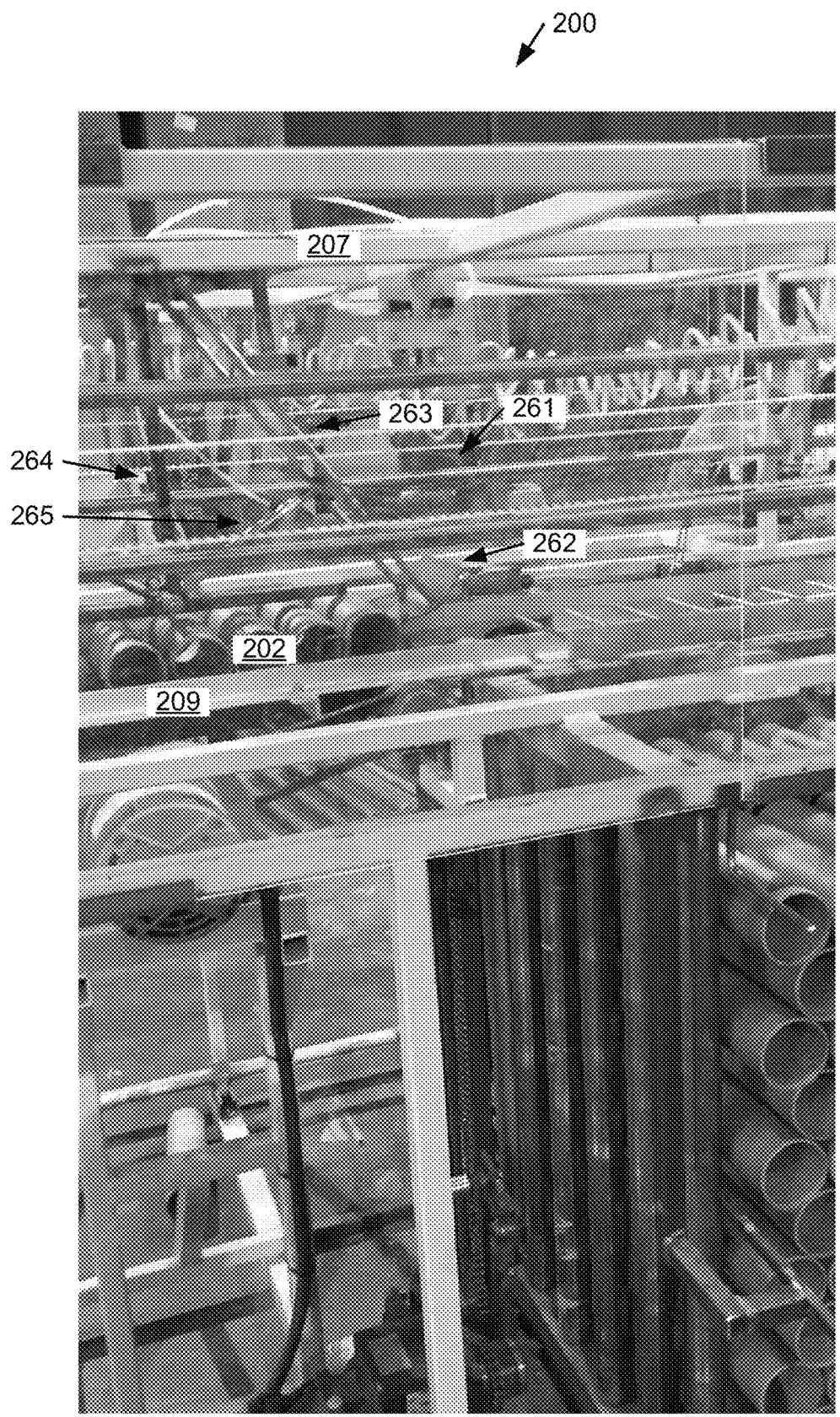
FIGS. 4P and 4Q illustrate implementations of example tube stopping operations by the example automated round tube loading machine according to the present disclosure.
Figure 4Q:
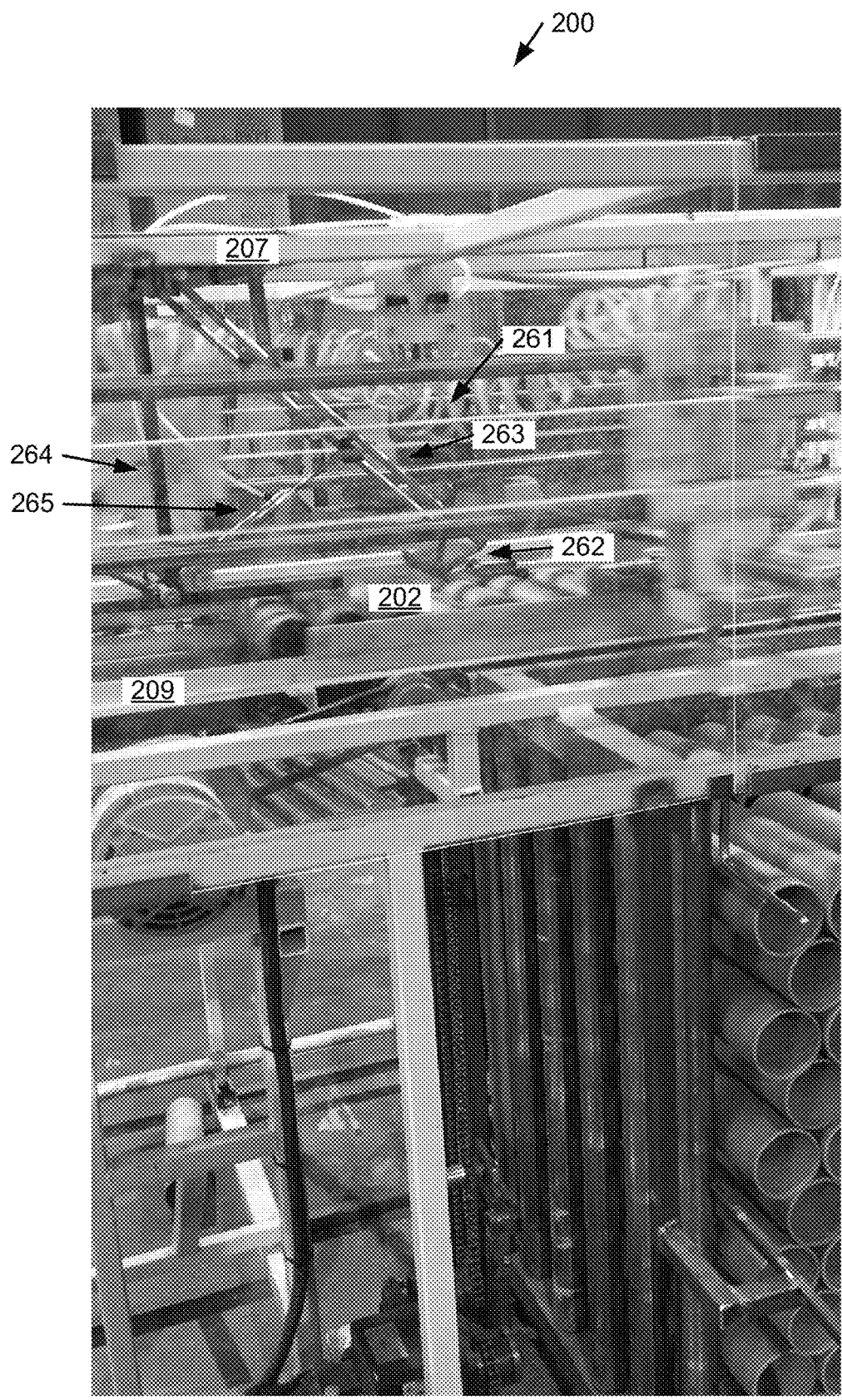

As shown in FIGS. 4P and 4Q, in some implementations, the tube receiver 209 may further comprise a tube stop 261. In some implementations, the tube stop 261 may comprise a stop plate 262, one or more supports 263, 264, and an air cylinder 265.

In some implementations, one support 263 is movably attached between the frame 207 and the stop plate 262 such that the support 263 allows movement of the stop plate 262 toward and away from the tube receiver 209. In some implementations, the other support 264 is attached between the frame and/or the tube receiver 209 and the air cylinder 265 such that the air cylinder 265 is supported to move the first support 263.

In some implementations, the air cylinder 265 is movably attached between the supports 263, 264 such that operation of the air cylinder 265 moves the first support 263 to move the stop plate 262 toward or away from the tube receiver 209 for operation of the tube stop 261 as described herein.

In some implementations, the stop plate 262 may comprise any suitable component configured to be lowered to make contact with a tube 202 to allow the tube stop 261 to stop or hold a plurality of tubes 202 on the tube receiver 209 to be picked up by the automated round tube loading machine 200 as described herein. In some implementations, such component composing the stop plate 262 is also configured to be raised to allow the tube stop 261 to release the tubes 202 on the tube receiver 209 to be moved by the automated round tube loading machine 200 to the elevator 203 as described herein.

For example, in some implementations, the stop plate 262 may comprise a rectangular or generally rectangular shaped plate that is sized to make contact with a tube 202 on the tube receiver 209 as described above.

In some implementations, the supports 263, 264 may respectively comprise any suitable components configured to attach to the other components of the tube stop 261 as described above and to allow the operation of the tube stop 261 as also described. For example, in some implementations, the supports 263, 264 may respectively comprise an elongated circular or rectangular rod or tube.

In some implementations, the air cylinder 265 may be a pneumatic cylinder or any other suitable type of cylinder, for example similar to other air cylinders of the automated round tube loading machine 200 described herein.

In some implementations, the tube stop 261 is configured to stop or hold a plurality of tubes 202 on the tube receiver 209 in a position to be received and/or picked up by the automated round tube loading machine 200 as described herein. For example, in some implementations, the tube stop 261 is configured to move the stop plate 262 toward the tube receiver 209 by a retraction of the air cylinder 265 to stop or hold a movement of the tubes 202 along the tube receiver 209 with respect to the automated round tube loading machine 200 receiving and/or picking up the tubes 202 as described herein.

In some implementations, the tube stop 261 is configured to release the tubes 202 on the tube receiver 209 to allow the automated round tube loading machine 200 to move and/or drop-off the tubes 202 from the tube receiver 209 to the elevator 203 as described herein. For example, in some implementations, the tube stop 261 is configured to move the stop plate 262 away from the tube receiver 209 by an extension of the air cylinder 265 to release the tubes 202 on the tube receiver 209 with respect to the automated round tube loading machine 200 moving and/or dropping off the tubes 202 as described herein.

In some implementations, the tube stop 261 may comprise any other suitable components and/or configuration thereof to provide the features of the tube stop 261 with respect to the present disclosure.

As shown in FIGS. 2A and 4D, in some implementations, the tube receiver 209 may alternately further comprise a tube stop 221. As shown in FIG. 4J, in some implementations, the tube stop 221 may comprise a horizontal bar 221a and one or more perpendicular extensions 221b. In some implementations, the tube stop 221 may also comprise an operating mechanism (not shown).

In some implementations, the horizontal bar 221a is movably attached between the left and right sides of the automated round tube loading machine 200 at or adjacent to the end of the tube receiver 209. In some implementations, the horizontal bar 221 may also be attached on one or both ends to the operating mechanism.

In some implementations, the extensions 221b are attached to the bar 221a such that the extensions 221b can be raised by the bar 221a to stop or hold the tubes 202 and lowered to release the tubes 202 as described above. For example, in some implementations, the extensions 221b are attached to the bar 221a such that the bar 221a can rotate to raise or lower the extensions 221b as described.

In some implementations, the bar 221a may comprise any suitable component configured to attach to the extensions 221b and the tube receiver 209 as described above and to allow the operation of the tube stop 221 as described herein. For example, in some implementations, the bar 221a may comprise an elongated circular or rectangular rod or tube.

In some implementations, the extensions 221b may comprise any suitable component configured to be raised (e.g. rotated/flipped upward) to make contact with a tube 202 to allow the tube stop 221 to stop or hold a plurality of tubes 202 on the tube receiver 209 to be picked up by the automated round tube loading machine 200 as described herein. In some implementations, such component composing the extensions 221b is also configured to be lowered (e.g. rotated/flipped downward) to allow the tube stop 221 to release the tubes 202 on the tube receiver 209 to be moved by the automated round tube loading machine 200 to the elevator 203 as described herein.

For example, in some implementations, the extensions 221b may comprise rectangular bars that are sized to make contact with a tube 202 on the tube receiver 209 as described above.

In some implementations, the operating mechanism may comprise any suitable mechanism, such as a motor, actuator, etc., configured to operate the tube stop 221 as described herein.

In some implementations, the tube stop 221 is configured to stop or hold a plurality of tubes 202 on the tube receiver 209 in a position to be picked up by the automated round tube loading machine 200 as described herein. For example, in some implementations, the tube stop 221 is configured to move the extensions 221b upward toward the tube receiver 209 by the operating mechanism to stop or hold a movement of the tubes 202 along the tube receiver 209 with respect to the automated round tube loading machine 200 receiving and picking up the tubes 202 as described herein.

In some implementations, the tube stop 221 is configured to release the tubes 202 on the tube receiver 209 to allow the automated round tube loading machine 200 to move the tubes 202 from the tube receiver 209 to the elevator 203 as described herein. For example, in some implementations, the tube stop 221 is configured to move the extensions 221b downward away from the tube receiver 209 by the operating mechanism to release the tubes 202 on the tube receiver 209 with respect to the automated round tube loading machine 200 moving the tubes 202 as described herein.

In some implementations, the tube stop 221 may comprise any other suitable components and/or configuration thereof to provide the features of the tube stop 221 with respect to the present disclosure.

In some implementations, the tube receiver 209 may further comprise a tube sensor (not shown). In some implementations, the tube sensor is configured to sense the presence of tubes on the tube receiver 209 to be picked up. In some implementations, the tube sensor is configured to signal one or more components of the automated round tube loading machine 200 to pick up the sensed tubes from the tube receiver 209.

As introduced above and shown in FIGS. 2A-2B and 3B-3C, in some implementations, the tube pickup mechanism 201 also comprises left and right side main track assemblies 210, 211. In some implementations, the left and right side main track assemblies 210, 211 are Thomson style rod and bearing track assemblies. More generally, in some implementations, the track assemblies 210, 211 are a linear guide system or a linear slide that comprises one or more linear guides or rods and one or more linear motion bearings or bearing assemblies configured to move along the guides. For example, in some implementations, the track assemblies 210, 211 are a round rail linear guide system or a round shaft linear slide. In some implementations, the track assemblies 210, 211 can be any other suitable type or style of guide system or slide.

As shown in FIGS. 2A-2B and 3B-3C, in some implementations, the left and right side main track assemblies 210, 211 comprise respectively a left side track 222 and a right side track 223.

In some implementations, the left and right side main track assemblies 210, 211 comprise respectively a left side bearing assembly (or "carriage head", "carriage") 224 and a right side bearing assembly (or "carriage head", "carriage") 225.

In some implementations, the left and right side main track assemblies 210, 211 comprise respectively left and right side air cylinders 227, 228.

In some implementations, the left and right side main track assemblies 210, 211 are mounted respectively adjacent to the left side 218 and the right side 219 of the automated round tube loading machine 200. In some implementations, the left and right side main track assemblies 210, 211 are mounted extending between the front side 217 and the back side 220 of the automated round tube loading machine 200.

In some implementations, the left side track 222 and the right side track 223 are respectively adjacent and extend parallel to the left side 218 and the right side 219 of the automated round tube loading machine 200.

In some implementations, the left and right side tracks 222, 223 each comprise one or more rods 226.

In some implementations, the left and right side carriages 224, 225 are configured respectively to move linearly along the left and right side tracks 222, 223.

In some implementations, the left and right side air cylinders 227, 228 are pneumatic cylinders. In some implementations, the left and right side air cylinders 227, 228 are any other suitable type of cylinders.

In some implementations, the left and right side air cylinders 227, 228 are small. For example, in some implementations, the left and right side air cylinders 227, 228 each comprise an eight inch piston rod 229, 230 stroke. In some implementations, the left and right side air cylinders 227, 228 are any other suitable size.

In some implementations, the left and right side air cylinders 227, 228 are mounted respectively to the left and right side carriages 224, 225. In some implementations, the left and right side air cylinders 227, 228 are mounted respectively perpendicular to the tracks 222, 223 of the left and right side main track assemblies 210, 211. In some implementations, the left and right side air cylinders 227, 228 are connected to other components of the automated round tube loading machine 200 as described below.

As introduced above and shown in FIGS. 2A-2B and 3B-3C, in some implementations, the tube pickup mechanism 201 also comprises left and right side secondary track assemblies 212, 213. As shown in FIGS. 2A-2B and 3B-3C, in some implementations, the left and right side secondary track assemblies 212, 213 are similar to the above described left and right side main track assemblies 210, 211. In some implementations, the left and right side secondary track assemblies 212, 213 are a similar smaller version of the left and right side main track assemblies 210, 211.

In some implementations, the left and right side secondary track assemblies 212, 213 additionally comprise respectively a left and right side pickup bar 231, 232 and left and right side pickup fingers 233, 234.

In some implementations, the left and right side secondary track assemblies 212, 213 are mounted respectively to the carriages 224, 225 of the left and right side main track assemblies 210, 211. For example, in some implementations, the carriages 235, 236 of the left and right side secondary track assemblies 212, 213 are mounted respectively to the carriages 224, 225 of the left and right side main track assemblies 210, 211.

In some implementations, the left and right side secondary track assemblies 212, 213 are mounted respectively perpendicular to the left and right side main track assemblies 210, 211. For example, in some implementations, the tracks 237, 238 of the left and right side secondary track assemblies 212, 213 extend respectively perpendicular to the tracks 222, 223 of the left and right side main track assemblies 210, 211.

As introduced above and shown in FIGS. 2A-2B and 3B-3C, in some implementations, the left and right side main track assemblies 210, 211 comprise respectively the left and right side air cylinders 227, 228 which are mounted respectively to the left and right side carriages 224, 225. In some implementations, the left and right side air cylinders 227, 228 are also connected respectively to the carriage 235, 236 of the left and right side secondary track assemblies 212, 213. In some implementations, the left and right side air cylinders 227, 228 are mounted respectively to the left and right side carriages 224, 225 above and parallel to the tracks 237, 238 of the left and right side secondary track assemblies 212, 213.

In some implementations, the left and right side air cylinders 227, 228 are mounted and connected so that the operation of the air cylinders 227, 228 move respectively the left and right side tracks 237, 238 through the left and right side carriages 235, 236. For example, in some implementations, the air cylinders 227, 228 are mounted and connected so that the movement of the piston rods 229, 230 of the air cylinders 227, 228 move respectively the left and right side tracks 237, 238 through the left and right side carriages 235, 236.

As introduced above and shown in FIGS. 2A-2B and 3B-3C, in some implementations, the left and right side secondary track assemblies 212, 213 respectively comprise left and right side pickup bars 231, 232. In some implementations, as shown in FIGS. 2A-2B and 3B-3C, the left and right side pickup bars 231, 232 are mounted respectively to the left and right side tracks 237, 238. In some implementations, the left and right side pickup bars 231, 232 are mounted respectively extending adjacent and parallel to the left side 218 and right side 219 of the automated round tube loading machine 200.

In some implementations, the pickup bars 231, 232 are rectangular bars. In some implementations, the pickup bars 231, 232 are other than rectangular bars.

In some implementations, the pickup bars 231, 232 are aluminum bars. In some implementations, the pickup bars 231, 232 are other than aluminum bars.

In some implementations, the pickup bars 231, 232 are any other suitable configuration of bars.

As introduced above and shown in FIGS. 2A-2B and 3B-3C, in some implementations, the left and right side secondary track assemblies 212, 213 respectively comprise left and right side pickup fingers 233, 234. In some implementations, the left and right side pickup fingers 233, 234 extend respectively from the left and right side pickup bars 231, 232 toward the left side 218 and right side 219 of the automated round tube loading machine 200. In some implementations, the left and right side pickup fingers 233, 234 extend respectively perpendicular to the pickup bars 231, 232 and to the left side 218 and right side 219 of the automated round tube loading machine 200.

In some implementations, the left and right side pickup fingers 233, 234 are spaced apart respectively along the left and right side pickup bars 231, 232. In some implementations, the left and right side pickup fingers 233, 234 are spaced apart respectively along the pickup bars 231, 232 to insert into the openings of a respective plurality of round tubes 202 on the tube receiver 209.

In some implementations, the left and right side pickup fingers 233, 234 are configured to insert into the openings of a respective plurality of round tubes 202 on the tube receiver 209. In some implementations, the left and right side pickup fingers 233, 234 are configured to capture or secure in a group (or "pick up") the respective plurality of round tubes 202 from the tube receiver 209.

In some implementations, the left and right side pickup fingers 233, 234 are configured to move the respective plurality of round tubes 202 from the tube receiver 209 to the elevator 203. In some implementations, the left and right side pickup fingers 233, 234 are configured to release (or "drop off") the respective plurality of round tubes 202 at the elevator 203.

In some implementations, the left side pickup fingers 233 comprises twelve pickup fingers 233. In some implementations, the right side pickup fingers 234 comprises thirteen pickup fingers 234.

In some implementations, the left and right side pickup fingers 233, 234 comprise respectively less than twelve pickup fingers 233, 234. In some implementations, the left and right side pickup fingers 233, 234 comprise respectively more than thirteen pickup fingers 233, 234. In some implementations, the left and right side pickup fingers 233, 234 comprise respectively any other suitable number of pickup fingers 233, 234.

In some implementations, the respective number of pickup fingers 233, 234 of the left and right side pickup fingers 233, 234 respectively is configured to allow the tubes 202 picked up by the pickup fingers 233, 234 to be efficiently stacked together, for example, as described above for FIGS. 1A and 1B. For example, in some implementations, the respective number of pickup fingers 233, 234 is configured to allow the tubes 202 picked up by the pickup fingers 233, 234 to be most compactly stacked together.

In some implementations, the respective number of pickup fingers 233, 234 of the left and right side pickup fingers 233, 234 is configured to allow the tubes 202 that are picked up, stacked, and loaded by the automated round tube loading machine 200 to efficiently fit into boxes. For example, in some implementations, the respective number of pickup fingers 233, 234 is configured to allow the most amount of tubes 202 picked up, stacked, and loaded by the automated round tube loading machine 200 to fit into the boxes.

In some implementations, the pickup fingers 233, 234 are eight inches in length. In some implementations, the pickup fingers 233, 234 are less than eight inches in length. In some implementations, the pickup fingers 233, 234 are more than eight inches in length. In some implementations, the pickup fingers 233, 234 are any other suitable length.

In some implementations, the pickup fingers 233, 234 are one-half inch in width or diameter. In some implementations, the pickup fingers 233, 234 are less than one-half inch in width or diameter. In some implementations, the pickup fingers 233, 234 are more than one-half inch in width or diameter. In some implementations, the pickup fingers 233, 234 are any other suitable width or diameter.

In some implementations, the pickup fingers 233, 234 are stainless steel fingers. In some implementations, the pickup fingers 233, 234 are other than stainless steel fingers. In some implementations, the pickup fingers 233, 234 are any other suitable configuration of fingers.

As introduced above and shown in FIGS. 2A, 2B, and 3B, in some implementations, the tube pickup mechanism 201 also comprises left and right side timing belts 214, 215. As shown in FIGS. 2A, 2B, and 3B, in some implementations, the left and right side timing belts 214, 215 are mounted respectively extending adjacent and parallel to the left side 218 and right side 219 of the automated round tube loading machine 200. In some implementations, the left and right side timing belts 214, 215 also respectively extend adjacent and parallel to the left and right side main track assemblies 210, 211.

In some implementations, the left and right side timing belts 214, 215 are each configured to extend in a loop on the respective side 218, 219 of the automated round tube loading machine 200. In some implementations, the left and right side timing belts 214, 215 are each configured to extend in a loop having an upper ("top") belt side and a lower ("bottom") belt side respectively.

In some implementations, the left and right side timing belts 214, 215 are respectively attached to the left and right side carriages 224, 225 of the main track assemblies 210, 211. In some implementations, the bottom belt side 239 of the left side timing belt 214 is attached to the left side carriage 224. In some implementations, the top belt side 240 of the right side timing belt 215 is attached to the right side carriage 225. In some implementations, the left and right side timing belts 214, 215 are respectively attached to the left and right side carriages 224, 225 in any other suitable way with respect to the respective top and bottom belt sides of the timing belts 214, 215.

In some implementations, the respective attachments 241, 242 of the timing belts 214, 215 to the carriages 224, 225 are configured to move the carriages 224, 225 respectively along the tracks 222, 223 between the front and back sides 217, 220 of the automated round tube loading machine 200.

In some implementations, the respective attachments 241, 242 of the timing belts 214, 215 to the carriages 224, 225 are configured to move the carriages 224, 225 respectively by the movement of the respective timing belts 214, 215. For example, in some implementations, a movement of the bottom belt side attachment 241 by the left side timing belt 214 toward the front or back sides 217, 220 of the automated round tube loading machine 200 is configured to cause a respective movement of the attached left side carriage 224. Similarly, in some implementations, a movement of the top belt side attachment 242 by the right side timing belt 215 toward the front or back sides 217, 220 is configured to cause a respective movement of the attached right side carriage 225.

In some implementations, the respective attachments 241, 242 of the timing belts 214, 215 to the carriages 224, 225 are configured to move the carriages 224, 225 respectively in opposite directions with respect to the front and back sides 217, 220 by the common movement of the respective timing belts 214, 215 toward the front or back sides 217, 220. For example, in some implementations, a common (i.e. same) movement of the timing belts 214, 215 toward the front side 217 is configured to move the left side carriage 224 toward the back side 220 while moving the right side carriage 225 toward the front side 217. Similarly, in some implementations, a common movement of the timing belts 214, 215 toward the back side 220 is configured to move the left side carriage 224 toward the front side 217 while moving the right side carriage 225 toward the back side 220.

As introduced above and shown in FIGS. 2A-2C and 3B, in some implementations, the tube pickup mechanism 201 also comprises a timing belt drive mechanism 216. As shown in FIGS. 2A-2C and 3B, in some implementations, the timing belt drive mechanism 216 comprises one or more of a drive shaft 243, a pulley 244, and a drive motor 245. In some implementations, the timing belt drive mechanism 216 further comprises one or more of a drive gear box 246. In some implementations, the timing belt drive mechanism 216 further comprises one or more of any other suitable components for driving (i.e. moving) the timing belts 214, 215.

In some implementations, the timing belt drive mechanism 216 is configured to move the left and right side timing belts 214, 215.

In some implementations, the timing belt drive mechanism 216 is configured to move the timing belts 214, 215 as described above with respect to the respective attachments 241, 242 of the timing belts 214, 215 to the carriages 224, 225. For example, in some implementations, the timing belt drive mechanism 216 is configured to move the timing belts 214, 215 toward the front or back sides 217, 220 of the automated round tube loading machine 200.

In some implementations, the timing belt drive mechanism 216 is configured to cause the common movement, i.e. in the same direction and/or at the same time, of the timing belts 214, 215, such as described above with respect to the respective attachments 241, 242 of the timing belts 214, 215 to the carriages 224, 225.

In some implementations, the timing belt drive mechanism 216 is configured to cause the common movement of the timing belts 214, 215 toward the front and back sides 217, 220 in an alternating or reciprocating back and forth manner. In some implementations, the alternating back and forth movement of the timing belts 214, 215 causes a respective alternating back and forth movement of the main track assemblies 210, 211 toward the front and back sides 217, 220, including connected components such as the secondary track assemblies 212, 213.

In some implementations, the timing belt drive mechanism 216 is configured to move the timing belts 214, 215 in any other suitable manner.

As introduced above and shown in FIGS. 2A, 2C, 3A, and 3C, in some implementations, the automated round tube loading machine 200 also comprises an elevator 203. As shown in FIGS. 2A, 2C, 3A, and 3C, in some implementations, the elevator 203 comprises one or more of a platform 247 and a piston 248. In some implementations, the elevator 203 further comprises a plurality of vertical walls 249. In some implementations, the elevator 203 further comprises a holding area 253.

In some implementations, the elevator 203 further comprises one or more of any other suitable components to allow the stacking of tubes 202 for loading into boxes by the automated round tube loading machine 200.

In some implementations, the elevator 203 extends part of the length of the automated round tube loading machine 200. For example, in some implementations, the elevator 203 extends from the back side 220 to the tube receiver 209 of the automated round tube loading machine 200.

In some implementations, the elevator 203 is configured to stack grouped pluralities of the round tubes 202 into sets for loading of the tubes 202 into boxes 208. For example, in some implementations, the elevator 203, in cooperation with the tube pickup mechanism 201, is configured to stack eleven grouped rows of the round tubes 202 into vertically stacked sets of rows for loading of the tubes 202 into boxes 208.

In some implementations, the elevator 203 is configured to stack any other suitable number of grouped rows of the round tubes 202 into vertically stacked sets of rows for loading of the tubes 202 into boxes 208.

In some implementations, the elevator 203 is configured to receive pluralities of round tubes 202 that are sequentially grouped into a row (or "picked up") by the above described pickup fingers 233, 234. In some implementations, the elevator 203 is configured to receive and stack the pluralities of round tubes 202 in rows on the platform 247.

In some implementations, the vertical walls 249 are configured to support the pluralities of tubes 202 that are stacked in rows on the platform 247.

In some implementations, the vertical walls 249 are also configured to assist the release (or "drop off") of the tubes 202 onto the platform 247 from the pickup fingers 233, 234 along the left and right sides 218, 219 respectively of the automated round tube loading machine 200 at the elevator 203.

In some implementations, the platform 247 of the elevator 203 comprises a horizontal surface configured to stack the round tubes on.

In some implementations, the piston 248 of the elevator 203 is configured to vertically raise and lower the platform 247. In some implementations, the piston 248 is configured to raise the platform 247 to an initial upper position for receiving the grouped pluralities of tubes 202 onto the platform 247.

In some implementations, the piston 248 is configured to incrementally lower the platform 247 as or after each row of grouped tubes 202 is released (or "dropped off") at the elevator 203 from the pickup fingers 233, 234 to form a stack of the rows of tubes 202 on the platform 247. In some implementations, the piston 248 is configured to incrementally lower the platform 247 until a final lower position is reached to form a set of the rows of stacked tubes 202 for loading into a box 208.

In some implementations, the piston 248 is configured to re-raise the platform 247 to the initial upper position after the formed set of rows of stacked tubes 202 is removed and/or loaded from the platform into a box 208. In some implementations, the piston 248 is configured to subsequently repeat the raising and incremental lowering of the platform 247 to form sets of rows of stacked tubes 202.

In some implementations, the piston 248 is part of an air cylinder (not shown) that is similar to the air cylinders 227, 228 described above but, for example, larger in size, piston stroke, etc.

As shown in FIG. 3A, in some implementations, the holding area 253 of the elevator 203 is configured to hold one or more of the sets of the vertically stacked rows of tubes 202 formed on the elevator platform 247. In some implementations, the holding area 253 is further configured to hold a box 208 for loading of the one or more sets of tubes 202 into the box 208 from the holding area 253.

In some implementations, the holding area 253 is configured to allow the one or more sets of stacked rows of tubes 202 to be pushed end to end through the holding area 253 into a box 208.

In some implementations, the holding area 253 comprises a plurality of horizontal and vertical surfaces configured to receive and hold the one or more sets of stacked rows of tubes 202 that are formed on and removed from the elevator platform 247.

In some implementations, the holding area 253 further comprises one or more other suitable components configured to hold a box 208 for loading of the one or more sets of tubes 202 from the holding area 253 into the box 208.

Figure 2C:
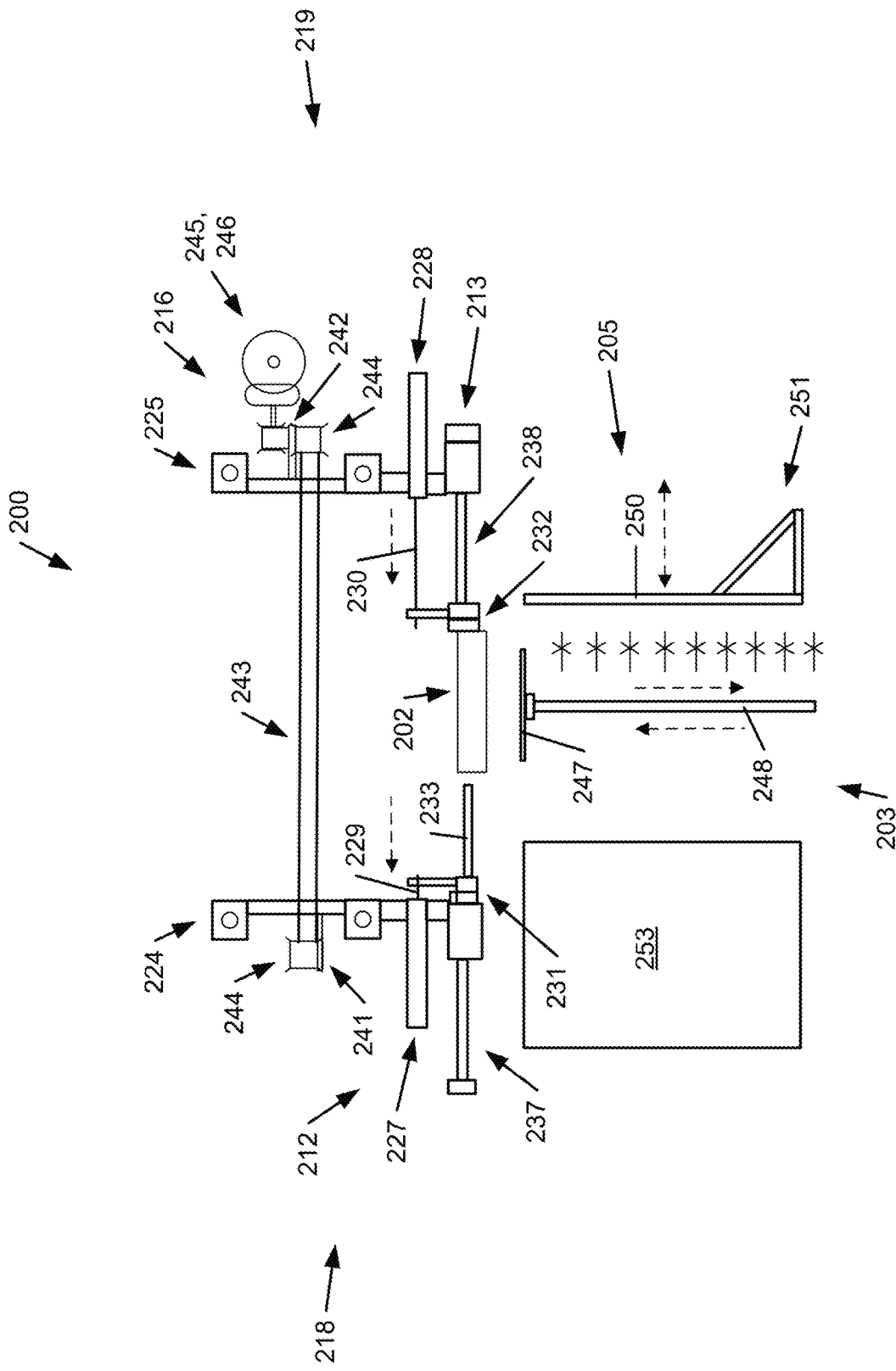
FIG. 2C illustrates a back side schematic representation of an implementation of the example automated round tube loading machine according to the present disclosure.

As introduced above and shown in FIGS. 2C and 3D, in some implementations, the automated round tube loading machine 200 also comprises a box plunger 205. As shown in FIGS. 2C and 3D, in some implementations, the box plunger 205 comprises one or more of a plunger wall 250 and a plunger mechanism 251. In some implementations, the box plunger 205 further comprises one or more of any other suitable components to allow loading of grouped pluralities of round tubes into boxes 208 by the automated round tube loading machine 200.

In some implementations, the box plunger 205 is configured to load sets of grouped pluralities of the round tubes 202 into boxes 208. For example, in some implementations, the box plunger 205 is configured to load sets of eleven vertically stacked alternating rows of thirteen of the round tubes 202 and twelve of the round tubes 202 into boxes 208. In some implementations, the box plunger 205 is configured to load sets of any other suitable number of vertically stacked alternating rows of the round tubes 202 into boxes 208.

In some implementations, the box plunger 205 is configured to load the sets of tubes 202 into the elevator holding area 253. In some implementations, the box plunger 205 is configured to load the sets of tubes 202 into boxes 208 by pushing an accumulation of the sets of tubes 202 through the holding area 253.

In some implementations, the plunger wall 250 is a vertical wall configured to move horizontally across the platform 247 of the elevator 203. In some implementations, the plunger wall 250 is configured to move horizontally across the platform 247 with the platform 247 in the final lower position described above with respect to the elevator 203. In some implementations, the plunger wall 250 is configured to move horizontally across the platform 247 with the platform 247 in any other suitable position.

In some implementations, the plunger wall 250 also functions as one of the vertical walls 100 described above with respect to the elevator 100.

In some implementations, the plunger wall 250 is configured to move across the platform 247 from an initial or normal position on one side of the automated round tube loading machine 200 to a temporary position on the other side. For example, in some implementations, the plunger wall 250 is configured to move across the platform 247 from the right side 219 to the left side 218 and back to the right side 219. In some implementations, the plunger wall 250 is configured to move across the platform 247 in any other suitable manner.

In some implementations, the plunger wall 250 is configured to push a set of grouped pluralities of the round tubes 202, such as the foregoing described examples, off the platform 247 when the plunger wall 250 moves across the platform 247. In some implementations, the plunger wall 250 is configured to push the set of grouped pluralities of the round tubes 202 into a box 208 when the plunger wall 250 moves across the platform 247.

In some implementations, the plunger mechanism 251 is configured to move the plunger wall 250 across the elevator platform 247. In some implementations, the plunger mechanism 251 is configured move the plunger wall 250 across the platform 247 in the foregoing described manner, such as from one side to the other side of the automated round tube loading machine 200. In some implementations, the plunger mechanism 251 is configured move the plunger wall 250 in any other suitable manner.

In some implementations, the plunger mechanism 251 may comprise a linear guide system configured similar to the above described secondary track assemblies 212, 213.

In some implementations, the plunger mechanism 251 may comprise a pneumatic pump similar the above described air pump of the elevator 203.

In some implementations, the plunger mechanism 251 may comprise any other suitable components to move the plunger wall 250.

As introduced above and shown in FIGS. 3A and 3E, in some implementations, the automated round tube loading machine 200 may further comprise a front side conveyor 254 and/or a back side conveyor 252. As shown in FIG. 3A, in some implementations, the front side conveyor 254 is configured to convey tubes 202 to the tube receiver 209 at the front side 217 of the automated round tube loading machine 200. For example, in some implementations, the front side conveyor 254 is configured to convey tubes 202 to the tube receiver 209 from a tube cutter or other source of the tubes 202 (not shown).

As shown in FIG. 3E, in some implementations, the back side conveyor 252 is configured to convey a box 208 loaded with tubes 202 away from the back side 220 of the automated round tube loading machine 200. For example, in some implementations, the back side conveyor 252 is configured to convey a box 208 loaded with one or more sets of grouped pluralities of the tubes 202 away from the elevator 203 adjacent to the back side 220.

In some implementations, the front side conveyor 254 and/or the back side conveyor 252 may be any suitable type of conveyor, such as a belt conveyor.

In some implementations, the front side conveyor 254 may comprise a gravity-feed (or gravity-fed) conveyor, hopper, or similar device/configuration that is configured to allow tubes 202 to feed to the tube receiver 209 of the automated round tube loading machine 200.

As introduced above and shown in FIG. 3E, in some implementations, the automated round tube loading machine 200 may further comprise a computer system 255 or similar component such as a controller, control circuitry, etc. In some implementations, the computer system 255 or similar component is configured to control, monitor, etc. any of the above described functions of the automated round tube loading machine 200. In some implementations, the computer system 255 or similar component is configured to control, monitor, etc. any functions of the example operation of the automated round tube loading machine 200 described below. In some implementations, the computer system 255 or similar component is configured to provide any other suitable functions with respect to the automated round tube loading machine 200.

In some implementations, the computer system 255 or similar component such as a controller, control circuitry, etc. comprises any suitable components.

In some implementations, the automated round tube loading machine 200 comprises any suitable dimensions, such as the example dimensions described above.

In some implementations, the automated round tube loading machine 200 is composed of any suitable materials, such as the example materials described above.

In some implementations, the automated round tube loading machine 200 can have any suitable appearance.

In some implementations, an example method of operation of the automated round tube loading machine 200 comprises the tube pickup mechanism 201 receiving a plurality of round tubes 202. In some implementations, the method comprises the tube pickup mechanism 201 capturing or securing in a group (or "picking up") the plurality of round tubes 202. In some implementations, the method comprises the tube pickup mechanism 201 moving the plurality of round tubes to the elevator 203. In some implementations, the method comprises the tube pickup mechanism 201 releasing or "dropping off" the plurality of round tubes 202 at the elevator 203. In some implementations, the method comprises the elevator 203 stacking the plurality of round tubes 202 to form a set of pluralities of the round tubes 202. In some implementations, the method comprises the box plunger 205 loading the formed set of pluralities of the round tubes 202 into a box 208.

As shown in FIGS. 4A and 4B, in some implementations, the plurality of round tubes 202 is received onto the tube receiver 209 of the tube pickup mechanism 201. In some implementations, thirteen tubes 202 are received. In some implementations, twelve tubes 202 are received. In some implementations, less than twelve tubes 202 are received. In some implementations, more than thirteen tubes 202 are received. In some implementations, any other suitable number of tubes 202 are received.

In some implementations, the plurality of round tubes 202 is received onto the tube receiver 209 positioned to allow the pickup fingers 233, 234 to be inserted into the openings of the tubes 202. For example, in some implementations, the plurality of round tubes 202 is received onto the tube receiver 209 positioned so that the openings of the tubes 202 face toward the left and right sides 218, 219 of the automated round tube loading machine 200.

In some implementations, the plurality of round tubes 202 is received onto the tube receiver 209 by manually placing the tubes 202. In some implementations, the plurality of round tubes 202 is received onto the tube receiver 209 from a front side conveyor (not shown). In some implementations, the front side conveyor provides tubes 202 to the tube receiver 209 from a tube cutter or other tube source (not shown).

As shown in FIGS. 4C and 4D, in some implementations, the plurality of round tubes 202 are captured or secured in a group (or "picked up") from the tube receiver 209 by the left side pickup fingers 233 or the right side pickup fingers 234. In some implementations, the plurality of round tubes 202 are picked up by the left side pickup fingers 233 or the right side pickup fingers 234 inserting into the openings of the tubes 202.

In some implementations, the left side pickup fingers 233 or the right side pickup fingers 234 insert into the openings of the tubes 202 by a respective operation of the left or right side air cylinder 227, 228. In some implementations, the respective operation of the left or right side air cylinder 227, 228 causes a respective movement through the respective secondary track assembly 212, 213 of the left or right side pickup fingers 233, 234 toward the tube receiver 209 on the left or right side 218, 219 respectively of the automated round tube loading machine 200.

In some implementations, the left side pickup fingers 233 and the right side pickup fingers 234 alternatingly pick up the plurality of round tubes 202 from the tube receiver 209.

In some implementations, the left side pickup fingers 233 pick up twelve tubes 202. In some implementations, the right side pickup fingers 234 pick up thirteen tubes 202. In some implementations, the left side pickup fingers 233 or the right side pickup fingers 234 pick up less than twelve tubes 202. In some implementations, the left side pickup fingers 233 or the right side pickup fingers 234 pick up more than thirteen tubes 202.

In some implementations, the left side pickup fingers 233 or the right side pickup fingers 234 pick up any other suitable number of tubes 202.

In some implementations, the right side pickup fingers 234 and the left side pickup fingers 233 alternatingly pickup an alternating number of tubes 202 respectively to form sets of vertically stacked rows of the alternating number of tubes 202 for loading into boxes 208.

In some implementations, the right side pickup fingers 234 and the left side pickup fingers 233 alternatingly pickup thirteen tubes 202 and twelve tubes 202 respectively to form sets of vertically stacked alternating rows of the thirteen tubes 202 and the twelve tubes 202 for loading into boxes 208. In some implementations, the right side pickup fingers 234 pick up thirteen tubes 202 to start and finish each set of vertically stacked alternating rows of thirteen tubes 202 and twelve tubes 202 for loading into the boxes 208.

In some implementations, the right side pickup fingers 234 and the left side pickup fingers 233 alternatingly pickup any other suitable alternating number of tubes 202 respectively to form sets of vertically stacked rows of the alternating number of tubes 202 for loading into boxes 208.

In some implementations, the plurality of round tubes 202 picked up from the tube receiver 209 are moved by the left side pickup fingers 233 or the right side pickup fingers 234 to the elevator 203.

As shown in FIGS. 4E and 4F, in some implementations, the plurality of round tubes 202 are alternatingly moved from the tube receiver 209 to the elevator 203 by the left side pickup fingers 233 and the right side pickup fingers 234. For example, in some implementations, the right side pickup fingers 234 move thirteen of the tubes 202 from the tube receiver 209 to the elevator 203 alternating with the left side pickup fingers 233 moving twelve of the tubes 202 from the tube receiver 209 to the elevator 203.

In some implementations, the left or right side pickup fingers 233, 234 move the plurality of round tubes 202 by an operation of the drive motor 245 causing the common movement of the timing belts 214, 215 toward the front side 217 and the back side 220 of the automated round tube loading machine 200 in an alternating or reciprocating manner. In some implementations, the alternating back and forth common movement of the timing belts 214, 215 alternatingly moves the left and right side pickup fingers 233, 234 to and from the tube receiver 209 and the elevator 203 through the respective main track assembly 210, 211 attached to the respective timing belt 214, 215.

As shown in FIGS. 4G and 4H, in some implementations, the plurality of round tubes 202 moved from the tube receiver 209 to the elevator 203 are released or "dropped off" by the left side pickup fingers 233 or the right side pickup fingers 234 onto the platform 247 of the elevator 203.

In some implementations, the left side pickup fingers 233 and the right side pickup fingers 234 alternatingly drop off the plurality of round tubes 202 onto the platform 247. For example, in some implementations, the right side pickup fingers 234 drop off thirteen of the tubes 202 onto the elevator platform 247 alternating with the left side pickup fingers 233 dropping off twelve of the tubes 202 onto the elevator platform 247.

In some implementations, the plurality of round tubes 202 are dropped off by the left side pickup fingers 233 or the right side pickup fingers 234 retracting out of the openings of the tubes 202.

In some implementations, the left side pickup fingers 233 or the right side pickup fingers 234 retract out of the openings of the tubes 202 by a respective operation of the left or right side air cylinder 227, 228. In some implementations, the respective operation of the left or right side air cylinder 227, 228 causes a respective movement through the respective secondary track assembly 212, 213 of the left or right side pickup fingers 233, 234 away from the elevator 203 on the left or right side 218, 219 respectively of the automated round tube loading machine 200.

As shown in FIGS. 4P and 4Q, in some implementations, the tube stop 261 operates during the above described operations by the automated round tube loading machine 200 of tube 202 receiving with respect to FIGS. 4A and 4B, tube 202 pick up with respect to FIGS. 4C and 4D, tube 202 moving with respect to FIGS. 4E and 4F, and tube 202 drop off with respect to FIGS. 4G and 4H.

As shown in FIG. 4P, in some implementations, during at least part of the tube 202 receiving operation and/or the tube 202 pick up operation of the automated round tube loading machine 200, the tube stop 261 operates to stop or hold one or more tubes 202 on the tube receiver 209 in a position to be received and/or picked up by the automated round tube loading machine 200. For example, in some implementations, during such operation of the automated round tube loading machine 200, the tube stop 261 moves the stop plate 262 toward the tube receiver 209 by a retraction of the air cylinder 265 to stop or hold a movement of the tubes 202 along the tube receiver 209 to allow the automated round tube loading machine 200 to receive and/or pick up the tubes 202.

As shown in FIG. 4Q, in some implementations, during at least part of the tube 202 moving operation and/or the tube 202 drop off operation of the automated round tube loading machine 200, the tube stop 261 operates to release the one or more tubes 202 on the tube receiver 209 to be moved and/or dropped off from the tube conveyor 209 to the elevator 203 by the automated round tube loading machine 200. For example, in some implementations, during such operation of the automated round tube loading machine 200, the tube stop 261 moves the stop plate 262 away from the tube receiver 209 by an extension of the air cylinder 265 to release the tubes 202 on the tube receiver 209 to allow the automated round tube loading machine 200 to move and/or drop off the tubes 202.

Alternately, as shown in FIGS. 4D and 4F, in some implementations, the tube stop 221 operates during the above described operations by the automated round tube loading machine 200 of tube 202 receiving with respect to FIGS. 4A and 4B, tube 202 pick up with respect to FIGS. 4C and 4D, tube 202 moving with respect to FIGS. 4E and 4F, and tube 202 drop off with respect to FIGS. 4G and 4H.

As shown in FIG. 4D, in some implementations, during at least part of the tube 202 receiving operation and/or the tube 202 pick up operation of the automated round tube loading machine 200, the tube stop 221 operates to stop or hold one or more tubes 202 on the tube receiver 209 in a position to be received and/or picked up by the automated round tube loading machine 200. For example, in some implementations, during such operation of the automated round tube loading machine 200, the tube stop 221 moves (e.g., rotates/flips or otherwise raises) the extensions 221b upward toward the tube receiver 209 by the operating mechanism to stop or hold a movement of the tubes 202 along the tube receiver 209 to allow the automated round tube loading machine 200 to receive and/or pick up the tubes 202.

As shown in FIG. 4F, in some implementations, during at least part of the tube 202 moving operation and/or the tube 202 drop off operation of the automated round tube loading machine 200, the tube stop 221 operates to release the one or more tubes 202 on the tube receiver 209 to be moved and/or dropped off from the tube conveyor 209 to the elevator 203 by the automated round tube loading machine 200. For example, in some implementations, during such operation of the automated round tube loading machine 200, the tube stop 221 moves (e.g., rotates/flips or otherwise lowers) the extensions 221b downward away from the tube receiver 209 by the operating mechanism to release the tubes 202 on the tube receiver 209 to allow the automated round tube loading machine 200 to move and/or drop off the tubes 202.

As shown in FIGS. 4I and 4J, in some implementations, the elevator 203 stacks the plurality of round tubes 202 into a set by incrementally lowering the platform 247 after each of the plurality of tubes 202 is dropped off onto the platform 247 by the pickup fingers 233, 234. In some implementations, the platform 247 is incrementally lowered from an initial upper position until a final lower position is reached to form a set of rows of stacked tubes 202 for loading into a box 208.

For example, in some implementations, the platform 247 is incrementally lowered from the initial upper position after each time the right side pickup fingers 234 drop off a row of thirteen of the tubes 202 alternating with the left side pickup fingers 233 dropping off a row of twelve of the tubes 202 onto the elevator platform 247. In some implementations, the platform 247 is incrementally lowered in this manner until the final lower position is reached to form a set of eleven stacked alternating rows of the tubes 202 for loading into a box 208.

In some implementations, the elevator platform 247 is incrementally lowered by an operation of the piston 248, for example, with respect to an air cylinder (not shown). In some implementations, the elevator platform 247 is incrementally lowered by the piston 248 in any other suitable way.

In some implementations, the elevator platform 247 is re-raised to the initial upper position after the set of rows of stacked tubes 202 is loaded into a box 208 or otherwise removed from the platform 247.

As shown in FIGS. 4K-4M, in some implementations, the box plunger 205 loads the formed set of pluralities of the round tubes 202 into a box 208 by moving the plunger wall 250 horizontally across the elevator platform 247. In some implementations, the plunger wall 250 is moved across the platform 247 with the platform 247 in the final lower position.

In some implementations, moving the plunger wall 250 across the elevator platform 247 pushes the formed set of pluralities of the round tubes 202 off of the platform 247 and into a box 208. For example, in some implementations, the plunger wall 250 pushes the formed set of eleven stacked alternating rows of thirteen of the tubes 202 and twelve of the tubes 202 off of the platform 247 and into a box 208.

In some implementations, the plunger wall 250 is moved across the elevator platform 247 by an operation of the plunger mechanism 251.

In some implementations, the plunger wall 250 is moved back across the elevator platform 247 to an initial or normal position after the set of tubes 202 is pushed off the platform 247.

In some implementations, the box plunger 205 loads the formed set of pluralities of the round tubes 202 into a box In some implementations, the box plunger 205 loads more than one set of the round tubes 202 into a box 208. For example, in some implementations, the plunger wall 250 pushes a first formed set of stacked alternating rows of the tubes 202 into the box 208 followed by a second formed set of the tubes 202.

In some implementations, the box plunger 205 is configured to load the one or more formed sets of tubes 202 into the elevator holding area 253. In some implementations, the box plunger 205 is configured to load one or more of the sets of tubes 202 into boxes 208 by pushing the sets of tubes 202 through the holding area 253 into a box 208 held in the holding area 253.

As shown in FIGS. 4N and 4O, in some implementations, a back side conveyor 252 conveys each box 208 away from the elevator 203 adjacent to the back side 220 after the box 208 is loaded with tubes 202 by the box plunger 205 as described in the foregoing.

The figures, including photographs and drawings, comprised herewith may represent one or more implementations of the automated round tube loading machine.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. An automated round tube loading machine, comprising: a tube pickup mechanism, an elevator, and a box plunger, wherein:

the tube pickup mechanism comprises a tube receiver, left and right side main track assemblies, left and right side secondary track assemblies, left and right side timing belts, and a timing belt drive mechanism;

the tube pickup mechanism is configured to group a plurality of round tubes into a row for stacking multiple rows of the tubes into sets for loading into boxes;

wherein:
the tube receiver comprises a horizontal surface to hold the plurality of tubes to be picked up;

the tube receiver extends at least partly between the front side of the automated round tube loading machine and the elevator;

the tube receiver is configured to receive the plurality of round tubes;

the left and right side main track assemblies comprise respectively a left and right side track, a left and right side carriage configured respectively to move linearly along the left and right side tracks, and a left and right side air cylinder mounted respectively to the left and right side carriage such that the left and right side air cylinders extend and retract respectively perpendicularly to the left and right side track;

the left and right side main track assemblies are mounted and extend respectively adjacent and parallel to the left and right side of the automated round tube loading machine between the front and back side of the automated round tube loading machine;

the left and right side secondary track assemblies comprise respectively a left and right side track, a left and right side carriage configured respectively to move linearly along the left and right side tracks, a left and right side air cylinder mounted respectively to the left and right side carriage such that the left and right side air cylinders extend and retract respectively perpendicularly to the left and right side track, a left and right side pickup bar mounted respectively to the left and right side track and extending adjacent and parallel to the left and right sides respectively of the automated round tube loading machine, and left and right side pickup fingers extending perpendicular respectively from the left and right side pickup bars toward the right and left sides respectively of the automated round tube loading machine and spaced apart respectively along the left and right side pickup bars such that the left and right side pickup fingers are insertable into the openings of a respective plurality of round tubes received on the tube receiver, wherein the left and right side pickup fingers are configured to insert into the openings of the respective plurality of round tubes, to pick up the respective plurality of round tube from the tube receiver, to move the respective plurality of round tube from the tube receiver to the elevator, and to drop off the respective plurality of round tube on the elevator;

the left and right side secondary track assemblies are mounted respectively to the carriages of the left and right side main track assemblies perpendicular to the left and right side main track assemblies such that the tracks of the left and right side secondary track assemblies extend respectively perpendicular to the tracks of the left and right side main track assemblies below and parallel to the left and right side air cylinders of the left and right side main track assemblies respectively, wherein the carriages of the left and right side secondary track assemblies are mounted respectively to the carriages of the left and right side main track assemblies;

the left and right side air cylinders of the left and right side main track assemblies respectively the left and right side secondary track assemblies are connected respectively to the left and right side carriages of the left and right side secondary track assemblies respectively such that the extension and retraction of the left and right side air cylinders of the left and right side main track assemblies respectively move respectively the left and right side tracks of the left and right side secondary track assemblies respectively through the left and right side carriages of the left and right side secondary track assemblies respectively;

the left and right side timing belts are mounted respectively extending adjacent and parallel to the left and right sides of the automated round tube loading machine each extending in a loop having an upper belt side and a lower belt side, wherein the lower belt side of the left side timing belt is attached to the left side carriage of the left side main track assembly and the upper belt side of the right side timing belt is attached to the right side carriage of the right side main track assembly such that a common movement of the left and right side timing belts by the timing belt drive mechanism causes the left side carriage of the left side main track assembly to move in a first direction along the left side track of the left side main track assembly while also causing the right side carriage of the right side main track assembly to move in an opposite second direction along the right side track of the right side main track assembly;

the timing belt drive mechanism comprises a drive motor, a drive shaft connected to the drive motor, and left and right side pulleys connected to the drive shaft, wherein the left side pulley movably engages the left side timing belt and the right side pulley movably engages the right side timing belt such that an operation of the timing belt drive mechanism moves the left and right side timing belts in a common direction and rotation around the left and right side pulleys respectively toward the front or back side of the automated round tube loading machine, and wherein the timing belt drive mechanism is configured to move the left and right side timing belts together in alternating motions toward the front and back sides of the automated round tube loading machine respectively and thereby cause the movement of the left and right side carriages of the left and right side main track assemblies respectively in alternating opposite directions with respect to each other between the front and back sides of the automated round tube loading machine;

the elevator comprises a receptacle having a platform and a piston and configured to receive and hold grouped pluralities of the round tubes, wherein:
the platform comprises a horizontal surface extending at least partly between the back side of the automated round tube loading machine and the tube receiver and configured to receive the grouped pluralities of the round tubes thereon;
the piston is attached to the platform and configured to extend upward and downward such that the platform is raised and lowered respectively, wherein the piston is further configured to raise the platform to an initial upper position such that the grouped pluralities of tubes can be initially received onto the platform, and incrementally lower the platform from the initial upper position to allow the drop off of rows of the grouped pluralities of the round tubes in the elevator from the left and right side pickup fingers to form a stack of the rows on the platform within the elevator until a final lower position of the platform is reached to form a set of the rows of stacked tubes to be loaded into a box; and
the box plunger comprises a plunger wall and a plunger mechanism connected to the plunger wall, and is configured to push vertically stacked rows of the tubes formed in the elevator off of the platform and out of the elevator, wherein the plunger wall comprises a movable vertical wall that normally positions adjacent to the elevator on the left or right side of the automated round tube loading machine and is configured to move horizontally across the platform of the elevator to a temporary position by operation of the plunger mechanism to push the vertically stacked rows of tubes formed in the elevator off of the platform and out of the elevator, and wherein the plunger mechanism comprises a movable mechanism configured to move the plunger wall between the normal position and the temporary position during an operation of the box plunger to push the vertically stacked rows of tubes formed in the elevator off of the platform and out of the elevator.

2. The automated round tube loading machine of claim 1, wherein the tube receiver further comprises a tube stop comprising a stop plate, a first support, a second support, and an air cylinder, wherein:
the first support is movably attached to the stop plate such that the first support allows movement of the stop plate toward and away from the tube receiver;
the second support is attached to the air cylinder such that the air cylinder is supported to move the first support;
the air cylinder is movably attached between the first support and the second support such that operations of the air cylinder moves the first support which moves the stop plate toward or away from the tube receiver respectively for operations of the tube stop;
the stop plate comprises a rectangular shaped plate that is sized to make contact with one of the tubes on the tube receiver;
the first support and the second support each comprise an elongated member;
the tube stop is configured to move the stop plate toward the tube receiver by a retraction of the air cylinder and thereby stop a movement of the tubes along the tube receiver thereby allowing the automated round tube loading machine to receive and pick up the tubes from the tube receiver; and
the tube stop is configured to move the stop plate away from the tube receiver by an extension of the air cylinder and thereby release the movement of the tubes along the tube receiver thereby allowing the automated round tube loading machine to move and drop off the tubes from the tube receiver to the elevator.

3. The automated round tube loading machine of claim 2, wherein the box plunger is further configured to push the vertically stacked rows of tubes out of the elevator and into the box to load the tubes into the box.

4. The automated round tube loading machine of claim 1, wherein the elevator further comprises a holding area comprising a horizontal surface extending perpendicularly from the elevator opposite the box plunger, and configured to receive and hold therein a set of the vertically stacked rows of tubes formed in the elevator.

5. The automated round tube loading machine of claim 4, wherein the holding area is further configured to hold the box therein to be loaded with the set of the vertically stacked rows of tubes formed in the elevator.

6. The automated round tube loading machine of claim 4, wherein the box plunger is further configured to push the vertically stacked rows of tubes out of the elevator and into the holding area.

7. The automated round tube loading machine of claim 1, further comprising a front side conveyor comprising a conveying device positioned adjacent to the front side of the automated round tube loading machine, and configured to convey the tubes to the tube receiver.

8. The automated round tube loading machine of claim 1, further comprising a back side conveyor comprising a conveying device positioned adjacent to the elevator and opposite the box plunger, and configured to convey the box loaded with the set of the vertically stacked rows of tubes away from the elevator.

9. The automated round tube loading machine of claim 1, further comprising a computer system configured to control the operation of the automated round tube loading machine.

10. The automated round tube loading machine of claim 1, wherein the tube receiver further comprises a tube sensor attached to the automated round tube loading machine and configured to sense tubes received on the tube receiver and to signal the automated round tube loading machine to pick up the sensed tubes from the tube receiver.

11. A method of operation of the automated round tube loading machine of claim 3, comprising:
receiving the plurality of round tubes onto the tube receiver, wherein the tubes are received positioned to allow the left and right side pickup fingers to be inserted into the openings of the tubes;
alternatingly picking up the plurality of round tubes from the tube receiver by the left side pickup fingers and the right side pickup fingers respectively;
alternatingly moving the plurality of round tubes from the tube receiver to the elevator by the left side pickup fingers and the right side pickup fingers respectively;
alternatingly dropping off the plurality of round tubes into the elevator by the left side pickup fingers and the right side pickup fingers respectively;
stacking the plurality of round tubes into a set by incrementally lowering the platform after each of the plurality of tubes is alternatingly dropped off onto the platform in the elevator by the left side pickup fingers and the right side pickup fingers respectively; and
loading the formed set of pluralities of the round tubes into the box from the elevator by the box plunger moving the plunger wall horizontally across the elevator platform.

12. The method of claim 11, further comprising:
holding the plurality of round tubes on the tube receiver by the tube stop in a position to be alternatingly picked up by the left side pickup fingers and the right side pickup fingers respectively; and
releasing the plurality of round tubes on the tube receiver by the tube stop to allow the tubes to be alternatingly moved from the tube receiver to the elevator by the left side pickup fingers and the right side pickup fingers respectively.

* * * * *